(12) United States Patent
Richmond et al.

(10) Patent No.: US 6,420,995 B1
(45) Date of Patent: Jul. 16, 2002

(54) RADAR AND IFF SYSTEM

(75) Inventors: Martin R. Richmond, Belmont, MA (US); Morton E. Goulder, Hollis, NH (US)

(73) Assignee: Systems Information and Electronic Systems Integration, Inc., Nashua, NH (US)

( * ) Notice: Subject to any disclaimer, the term of this patent is extended or adjusted under 35 U.S.C. 154(b) by 0 days.

(21) Appl. No.: 04/446,144

(22) Filed: Apr. 5, 1965

(51) Int. Cl.[7] ............................................... G01S 13/78
(52) U.S. Cl. ............................ 342/45; 342/13; 342/17; 342/19; 342/82; 342/85
(58) Field of Search .................... 343/100, 7, 5, 343/17.1, 11, 13, 14, 17.2; 342/13, 16, 17, 18, 19, 20, 82, 83, 85, 88, 89, 91, 94, 198

(56) References Cited

U.S. PATENT DOCUMENTS

| | | | | |
|---|---|---|---|---|
| 3,854,136 A | * | 12/1974 | Stull, Jr. | 342/16 |
| 3,859,661 A | * | 1/1975 | Ruvin et al. | 342/16 |
| 3,866,224 A | * | 2/1975 | Porter et al. | 342/16 |
| 3,895,385 A | * | 7/1975 | Alpers | 342/421 |
| 3,916,406 A | * | 10/1975 | Miller et al. | 342/18 |
| 3,943,515 A | * | 3/1976 | Miley | 342/17 |
| 3,947,848 A | * | 3/1976 | Carnahan et al. | 342/16 |
| 4,176,357 A | * | 11/1979 | Fales, III | 342/453 |
| 4,264,909 A | * | 4/1981 | Hamilton et al. | 342/13 |

* cited by examiner

*Primary Examiner*—John B. Sotomayor
(74) *Attorney, Agent, or Firm*—Daniel J. Long

(57) ABSTRACT

A silent radar system which detects a target and its position without the countermeasure operator located at the target being able to detect the presence of the radar. The silent radar operates by transmitting signals with specific characteristics which allow optimum processing by the radar while taking advantage of the limitations inherent in typical signal receiving equipment. The silent radar transmits low energy per cycle signals which are wideband, purely random noise, e.g. spread spectrum signals.

48 Claims, 7 Drawing Sheets

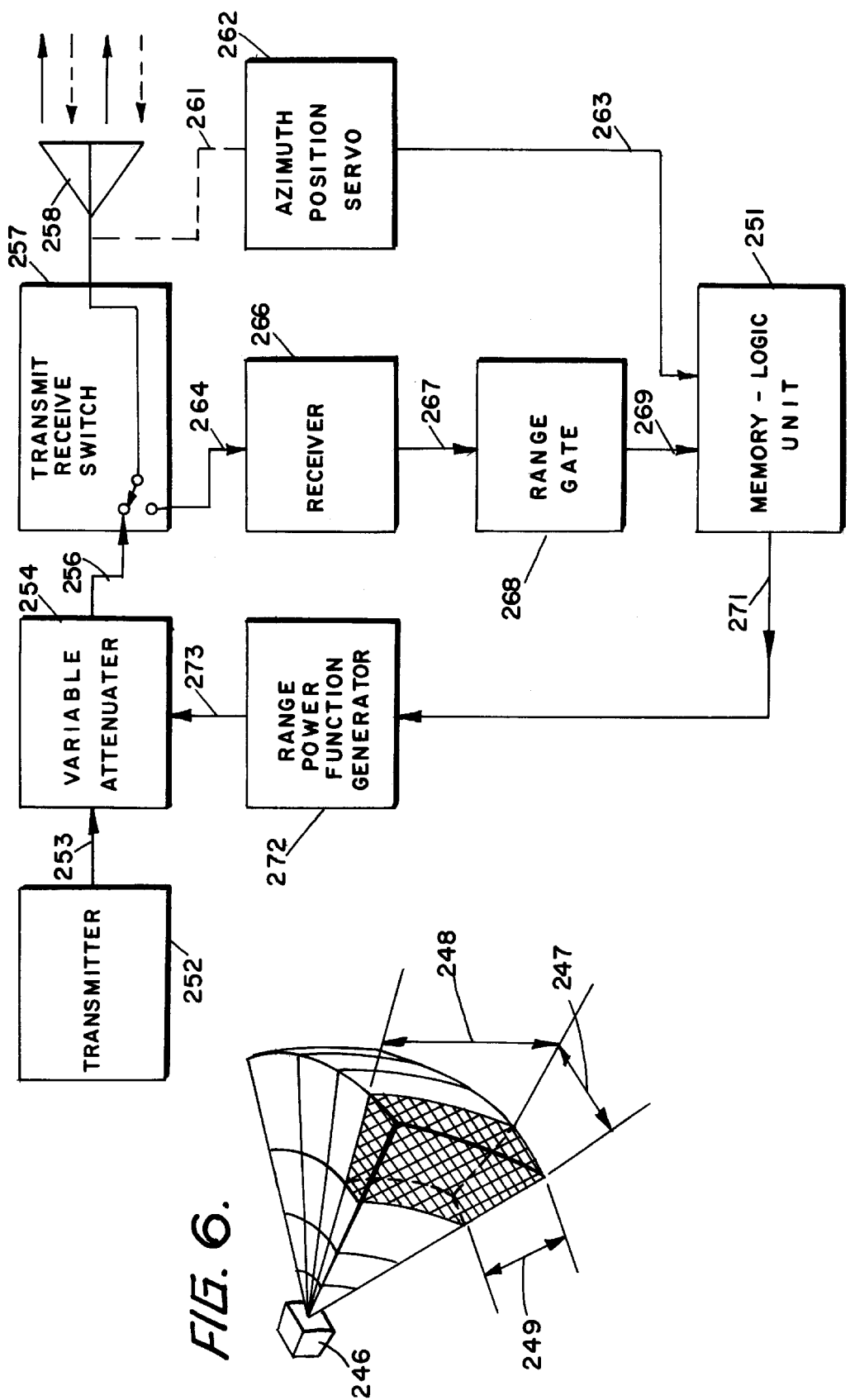

RADAR AND IFF SYSTEM

BACKGROUND OF THE INVENTION

This invention relates to a silent operating radar, i.e., a radar that detects a target and its position without the countermeasure operator located at the target being able to detect the presence of the radar.

More specifically, this invention relates to a silent operating radar that provides transmitted signals with characteristics which allow optimum processing by the radar while taking advantage of limitations inherent in typical radar interception receiving equipment located at the target.

Today, the problems of modernized warfare have increased to the point that high speed aircraft or other craft well-equipped with newly developed electronic countermeasure receivers and jammers can quickly penetrate areas to be defended. Prior to this invention, invading aircraft or other craft have had the benefit of knowing that they were being detected because of the large signal power levels utilized in the tracking radar. Once they determined that they were in fact being observed, they would enter evasive patterns and also utilize their countermeasure electronics to jam the tracking radar. Furthermore, they would be able to launch missiles to home in the radar signal and thereby cause the radar's destruction. This advantage that the target aircraft has had is removed by the usage of a radar system employing the invention to be described. With the utilization of the invention the invading craft can no longer determine that their presence has been detected. Not knowing that they have been detected, the invading craft does not take evasive measures. He can not turn on his electronic countermeasure equipment to mislead the radar nor can he turn on his jamming equipment since these would give away his presence. Jamming and ECM equipment is only employed by the hostile craft only after he has been detected. Again, since the invader has not detected the presence of a radar, he has no reason to attempt to utilize radar homing missiles to destroy the radar.

The ability to operate a radar system in a silent mode is similarly important where ocean going vessels are involved since the presence and location of a moving fleet or submarine is critical to the success of an invading aircraft. As has been mentioned, once the invading aircraft is aware that it is being observed it can rely on its countermeasures equipment to mask its actual position. This advantage is present whether the tracking radar is ground-based, flying, or on ocean-going vessel. While the range of silent operation may be lessened by the size of the tracking radar's host craft and related antenna, the principle of this invention applies equally as well to them as with ground-based radars. Furthermore, the invention could also be utilized against search ships as well as aircraft.

SUMMARY OF THE INVENTION

The remainder of the description will be related to a ground-based radar but it should be understood that the invention is not limited to a ground-based environment but can be utilized in ships or aircraft having the capacity to handle such equipment.

The invention to be described more fully hereafter removes completely the possibility that the oncoming craft will be able to detect the presence of an operating ground-based radar. This has been accomplished through the utilization of equipment providing transmission signals with specific characteristics that allow optimum processing while taking advantage of limitations inherent in typical signal receiving equipment. In addition, the ground-based radar utilizing the concept of the invention is optimized to efficiently detect and process a target's reflected signals.

It is well known that the receivers at the target making an approach have only to overcome a one-way path loss with reference to the transmitted radar signal, while the ground-based radar has the additional loss inherent in the reflected radar signal from the incoming target. This reflected loss is measured as the fourth power of the radial distance from the target to the ground-based radar, while the one-way path loss to the target is on the order of a second power loss based on the radial distance from the radar to the target. Since the ground-based radar receives what is in essence a two-way path loss, the ground-based radar must be optimized to a point at which the advantage held by the target because of path loss considerations is overcome.

This invention provides a range of self-protection around the ground-based radars. This self-protection range may be defined as an intermediate range within which radar intercept receiver systems having set operating characteristics cannot detect the presence of the ground-based radar system. This aforementioned self-protection comes about due to the ground-based radar's detection advantage over the approaching target.

Where high energy per cycle is transmitted the target receiver operator can detect the presence of the ground-based radar by slowly sweeping the bandwidth until the strong signal is identified. In this type of strong transmitted signal environment the transmitted signal only experiences a one-way path loss while a return echo from the plane experiences a second path loss, previously noted. If the ground-based radar has the same receiver capabilities as the target's receiver, the target could detect, the fact that it was being searched for before the ground-based radar could detect the target's presence.

The invention to be described makes use of transmitted low energy per cycle signals which take the form of wideband, purely random noise. In addition the ground-based radar, in accordance with the invention, has optimized all radar reception advantages to a point where even an extremely weak return signal can be detected though buried in the wide band noise originally transmitted and then reflected, whereas the target radar, because of space limitations, the size of the antenna and weight limitations cannot be optimized to have anywhere near the overall sensitivity and capacity to discriminate as a ground-based radar.

With the aforementioned transmission characteristics it becomes apparent that where a low energy signal per cycle is transmitted, there is some point near the ground-based radar where the one-way path loss is insufficient to prevent the target from detecting the low energy signal. Further removed from the ground-based radar, the target cannot detect the presence of the ground-based radar but the transmitted signals are still being reflected by the target. At this point the optimized ground-based radar functions to detect even the very weak reflected signals, experiencing a two-way path loss. There is of course a specific distance through which the reflected signal can pass before it is attenuated to a point where the ground-based radar even with optimized receivers cannot detect the reflected signal. The just mentioned specific distance represents the ground-based radar's detection advantage over the target. The distance from the near point, where the target can detect the presence of a signal being transmitted, and the specific distance just noted defines the ground-based radar's region of self-protection.

This may be referred to as intermediate self-protection range or the volume that it defines about the ground-based radar may be termed a self-protection shell.

It is therefore apparent that as the energy per cycle changes by way of increase or decrease, the dimensions of the self-protection range or shell will change. The operator of the ground-based radar therefore has the ability to increase or to decrease the range being searched in a manual manner or automatically in a programmed manner to be described in detail more fully hereafter.

The silent ground-based radar involved here will transmit a spread spectrum which is essentially noise and then use coherent integration and correlation detection to extract information from the return echo. The fact that optimum detection is possible is brought about because the radar can maintain a record of the signal it has transmitted long enough to compare the record with the return echo and find a correlation. This detection of the echo return is possible because the ground-based radar has stored, as noted above, the history of the signal prior to its transmission and therefore, when the return echo appears, this signal history is compared by correlation techniques to be described and from it is extracted information concerning the target's position and velocity.

Utilizing this technique, the radar employs a detection advantage that can be over one million times that of a typical target's receiving equipment, this advantage being gained from the fact that the target has no prior knowledge of the history of the transmitted radar signal.

In the above description, it has been mentioned that the ground-based radar has a maximized or optimized advantage over that of the target. This optimization of detection advantage is further enhanced by the ground-based radar's ability to use a much larger antenna than possible on the target aircraft. It can therefore be seen that the capture area of the ground-based radar can provide typically an advantage over the target of a magnitude greater than 1,000 to 1 especially where large ground or ship-based radar antenna-are available.

The ground-based radar's circuitry and components are similarly maximized to obtain signal-to-noise ratios not obtainable by receiving equipment located on a target due to size, weight, power and other limitations. Along with the ability to maximize antenna capture area there is also the ability to design the antenna for maximum efficiency at the known frequencies that are to be transmitted. As noted above, target aircraft antenna must be designed for wide band reception and must be compatible with flight characteristics of the craft. Therefore it can be seen that the ground-based radar can maintain an advantage of a magnitude many times that of a typical target receiver.

A final and important aspect of optimizing the detection advantage of ground-based radar lies in the conjunctive use of an intercept radar receiver that is capable of finding the most crowded portion of the frequency spectrum and then it can shift the transmission of the ground-based radar into the region of greatest signal density and thereby reduce the probability of the target detecting the transmission of the ground-based radar's signals.

Additional Benefits and Applications of the Silent Radar System

In addition to its ability to detect targets without itself being detected, silent radar has certain other features which increase its useful-ness as described below:

D-1931 Discrimination Against Clutter

Since silent radar will employ both range and speed gating, it has two effective types of clutter filtration. That is, the silent radars range and speed gating functions remove clutter in all situations except those in which the clutter has both the same range and speed as the target. Clutter at other ranges will not correlate properly with the silent radar's internally delayed random pulse signal. This feature is particularly significant in eliminating the clutter which enters the antenna sidelobes of an airborne doppler radar because of the aircraft's own motion.

Reduced EGM Vulnerability Since the silent radar system will employ range and speed gating and transmits broadband noise at low levels of energy per cycle, it has certain anti-ECM features.

Another advantage of the inventive radar system is since the signal transmitted is a broadband noise signal having a random spectrum even if it were received on a target intercept receiver, it does not look like a radar signal. Both manual and automative recognition equipment,is quite ineffective at the intercept receiver even when positive signal-to-noise ratios are achieved. In normal operation, the signal received by the target's receiver will be below this signal-to-noise threshold.

Still another benefit of the invention is that most intercept receivers pick up the radar sidelobes rather than the main beam because of the greater number of sidelobes and therefore the increased probability is that the target will be illuminated by the sidelobes rather than the main beam. Since normal radar sidelobes are −20 to −30 db down from the main beam and the same holds true of the invention, the signal from the invention would not be able to be intercepted in the radar sidelobe region even if the signal in the main beam was strong enough to be detected.

Against repeater type jammers, the silent radar has greater invulnerability to range deception since range gates are extremely narrow as a result of the very wide spectrum transmitted. As repeater type jammers have inherent minimum delays which are greater than the equivalent range resolution of this radar, their false signals can only appear in gates at ranges greater than the skin echo of the target, and therefore can be ignored. Even if the false doppler signals are introduced into a silent radar by a repeater jammer employing frequency translation techniques, they will always appear at a greater target range than the true echo.

CW jammers can be eliminated with tracking rejection filters with negligible degradation to the reflected target signal.

Cooperation with Friendly Targets

Repeater type jammers in friendly aircraft could be used to amplify and repeat the silent radar signal even though this signal's power level is extremely low (even below the natural noise level in the jammer's receiving components). Suitable electronic circuitry in the repeater could pulse the amplified repeated radar signal, on and off, in a coded fashion. The return signal from such a repeater, when received by the silent radar system, could be decoded and used to identify the aircraft as friendly.

Or, even more detailed information could be transferred from aircraft to radar. Such information could actually identify the aircraft as to class, squadron, aircraft number, etc. Such coding would not reduce the effectiveness of the repeater in its assigned ECM mission and yet would add an important information collection capability to silent radar. The aircraft carrying the repeater would never know it had been "seen" by the silent radar, but the information would still be automatically exchanged.

It is a principal object of this invention to provide a silent radar whose transmission cannot be identified by an approaching intercept receiver.

It is another object of this invention to provide a silent radar that has a variable output power system for the detection of targets without itself being detected.

Another object of this invention is to provide a radar system which suppresses clutter to a minimum.

Another object of this invention is to provide a radar system that obtains unambiguous range and velocity information of a target or targets.

Another object of this invention is to provide a silent radar system which employs a variable coded or uncoded frequency spread (modulation sweep or pulse compression) together with random or non-random phase reversals controlled by a pulse signal to generate wideband random noise spectra which can be remembered by narrower band delay devices.

Another object of this invention is to steer wide noise transmission into crowded portions of the electromagnetic spectrum where other signals will mask the radar signal and thereby provide a silent radar.

Another object of this invention is to provide an unambiguous radar that eliminates ambiguities in range and velocity by utilizing the transmission of wide band random noise and correlation techniques.

BRIEF DESCRIPTION OF THE DRAWINGS

Other objects will become apparent as a full and complete description of the invention is made, having reference to the drawings wherein:

FIG. 6 is a schematic representation of a plurality volume to be searched.

FIG. 7 is a simplified diagram of a typical search system employing range-azimuth power control.

DETAILED DESCRIPTION OF THE INVENTION

Figure 1:
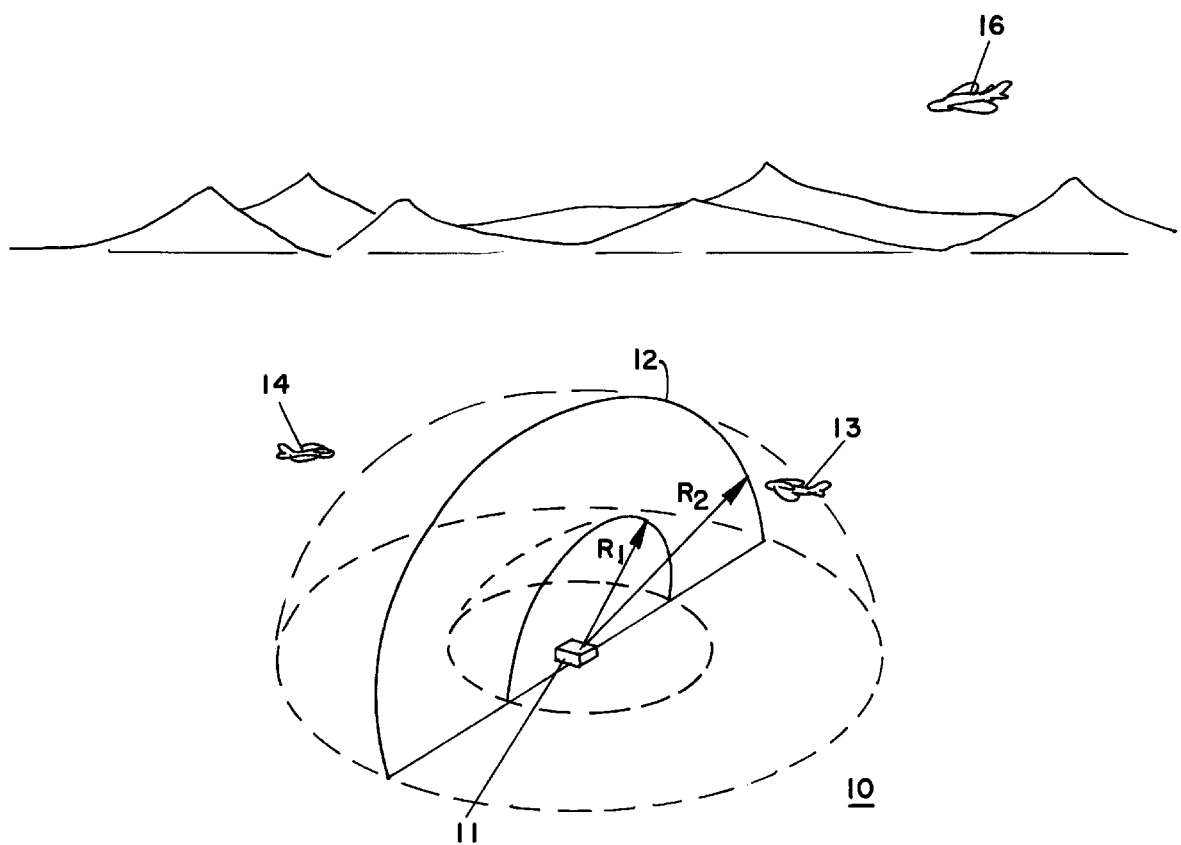
FIG. 1 is a three dimensional representation of a silent radar and self-protection shell.

Referring now to FIG. 1, there is depicted a three dimensional representation of a silent radar 11 covered by a self-protection shell 12. This FIG. 1 is intended to convey the basic concept set forth earlier in the specification, namely that the silent radar system 11 mounted on the ground 10 has a detection advantage over aircraft that fall within the self-protection shell 12. While this figure depicts the silent radar system 11 as securely located on the earth 10, the system which will be described more fully hereafter can also be utilized on naval craft in a water environment.

The thickness of the "self-protection shell" or what might also be termed an "intermediate range" is measured as the difference between $R_2$ and $R_1$. As pointed out earlier, the aircraft such as aircraft 14 would suffer a one-way path loss dependent on the $R^2$ parameter, that is, the radial distance from the silent radar 11 to the target aircraft 14. In this figure, target aircraft 14 is depicted as being outside the self-protection shell 12. This target would not know it was approaching the silent radar 11 because the $R^2$ losses that is, the one way path loss is of a magnitude that the signal reaching the craft would be well below the inherent noise level in the target aircraft's 14 receiver. Once an aircraft has entered the self-protection shell 12 such as aircraft 13, the one-way path loss to the target aircraft is still below an identifiable level within the target aircraft's receiver, while the return signals reflected from the target aircraft 13 would be weak because of the $R^4$ losses. The silent radar 11 has had its receiving antenna and related system optimized so that even the very weak reflected target signal buried in the noise can be detected. Correlation techniques known in the art and to be described hereafter can be employed to identify the reflected signal and thereby determine the target's position and velocity. Of course, as a target aircraft passes closer towards the silent radar system 11 and past the radial distance $R_1$, the target aircraft would then receive a signal of sufficient power to detect the fact that the radar system 11 was searching for the intercept aircraft 13. The reason that the target aircraft 13 can detect the fact that it is being tracked is because at a distance $R_1$ the one-way path loss is not sufficient to keep the transmitted signal level below the noise level of the target aircraft's 13 receiver. Accordingly, it is seen that for each power level of output depending on the amount of optimizing present in the silent radar, there will be determined differing dimensions to self-protection shell 12. In operation, the initial power level would be very, very low and the self-protection shell would cover a shorter range than that depicted in FIG. 1. Once the operator of the silent radar has swept the range the system is set for, and has not detected the presence of an aircraft, he may proceed to increase the power and thereby define a new region of self-protection within which his transmission will not be identified by the target aircraft.

The system to be described more fully hereafter contemplates varying the power output to thereby vary the range in accordance with the search program to be followed in the detection of invading target aircraft. In the illustration set forth in FIG. 1, a target aircraft 16 is located at a significant distance from the self-protection shell 12 and of course its presence would not be detected unless the self-protection shell was increased in range to encompass the target aircraft 16. For every system it should be noted there will invariably be an inherent maximum range to which the self-protection shell can be extended and this will be determined by the parameters involved in optimizing the silent radar reception. In conventional radar now in existence, ranges of 300 kilometers are practicable and even greater ranges depending upon the amount of optimizing of the ground-based radars can be expected.

Figure 2:
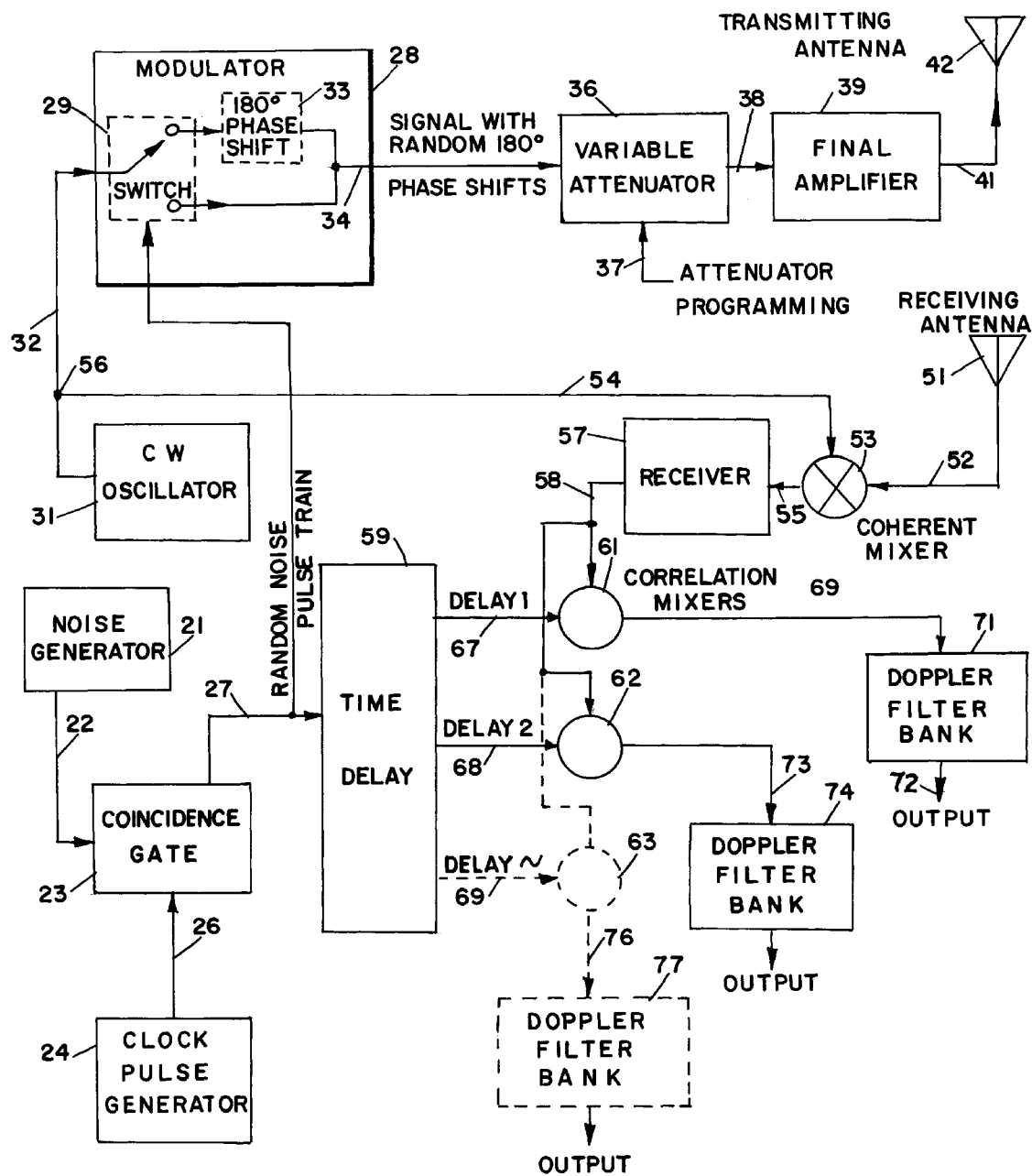
FIG. 2 is a simplified block diagram embodying the invention.

With reference now to FIG. 2 there is depicted a simplified block diagram embodying the invention. FIG. 2 represents a typical manner in which the silent radar system may be implemented. As has been pointed out earlier, one of the important aspects of the invention is the utilization of wide band noise as a silent radar's signal transmission. Throughout the specification to follow, a number of ways will be discussed in which this wide band noise may be generated and how the quality of complete randomness may be impressed on the transmitted radar's signal. At the outset it should be noted that while in the idealized form of this invention, the total random quality sought will inevitably enhance the capability of the silent radar system to avoid detection by any and all intercept aircraft in the range being studied, the quality of complete randomness in the transmitted signal is helpful but not absolutely essential to this invention. It is obvious that whenever a transmitted signal follows a predetermined pattern, that is, a pattern that repeats itself, the possibility and probability of detection will invariably increase on behalf of the searched-for intercept radar system.

In order to provide a random signal, the diagram set forth in FIG. 2 may be employed. Here there is depicted a clock pulse generator 24 which produces a pulse train, which pulse train is electrically transmitted via electrical connection 26 to a coincidence gate 23. The pulse train is combined in the coincidence gate with the output from a noise generator 21 which transmits its signal to the coincidence gate 23 via the electrical connection 22. The resulting output from the coincidence gate 23 is transmitted via electrical connection 27, and this output is a train of pulses with constant amplitude pulse widths which are random multiples of the clock 24 repetition period. This signal which is transferred via electrical connection 27 functions to operate a gate 29 in the form of a switch which in turn controls a CW signal from the CW oscillator 31 via electrical connection 3Z to the switch 29. When the switch 29 receives a negative (zero level) pulse, it gates the CW signal through 180° phase shifter 33, both, the switch 29 and the phase shifter 33 being located within the modulator 28. When a positive (one level) pulse is received, the CW signal from the oscillator 31 is passed with no phase shift. Therefore, the modulator output is a CW signal which is jumping 180° in phase in a random manner being gated by the random noise pulse train that was emitted from coincidence gate 23 via electrical connection 27. Because it is randomly reversing at a high rate and contains abrupt discontinuities, this signal occupies a broad spectral band width about the CW oscillator carrier frequency. The signal that passes from the modulator 28 just described passes via an electrical connection 34 to a variable attenuating device 36 which controls the system's output power level in response to a programmed input 37 from a programmer (not shown). This programmer and the implementation of this aspect of the system will be discussed with reference to FIGS. 6 to 8. After a power level increase in the final amplifier 39, the signal which has been transmitted via electrical connection 38 passes out of the final amplifier 39 and into the electrical connection 41 and thence to the antenna system 42.

The return echo signal carrying information about the target's radial velocity in the form of a doppler frequency shift is received by antenna system 51, and this signal passes through an electrical connection 52 to a coherent mixer 53 where this signal is coherently mixed with a sample of the CW oscillatort's 31 carrier frequency taken from tap 56 via electrical connection 54. In the alternative, a CW signal of different frequency could be applied to the mixer instead of the CW carrier frequency. The mixer output that appears in electrical connection 55 in this case will be an intermediate frequency (IF) signal which has been translated in frequency for ease of amplification and processing. The video or IF signal, depending on which is used in a given system, is then amplified by the receiver 57.

During the transmitted signal-time-to-target-and-return, the system has stored the radiated signal's phase history by delaying the random pulse noise signal from the coincidence gate 23 in the time delay device 59, which has received this random pulse noise signal information from an extension of electrical connection 27. Thus definite time delay intervals can be established to serve as range gates. FIG. 2 illustrates outputs from the time delay device 59 as signals present in electrical connections 67, 68 and 69 which respectively represent a delay 1, a delay 2, up to and including delay n. The delayed random pulse noise signal, for example, present in electrical connection 67 is then fed to correlation mixer 61 and is correlated with the output from receiver 57 transmitted via electrical connection 58 to the correlation mixer 61. In the illustration set forth in FIG. 2, the time delayed signals from the time delay device 59 are fed to one or more correlation mixers 62, 63. Each one of these mixers is associated with a separate time delay tap or range gate as it may be called. If the target is present at the range of the gate, that is, the delay in signal-to-target-and-return, the transmitted signal will equal the delay time of the random pulse noise signal from that delay tap and the return echo will correlate with the delayed phase history carried by the random pulse noise signal.

This correlation effectively reconstitutes a CW signal by reversing the 180° phase shifts applied before transmission and it recovers the doppler information carried on the return echo signal. Therefore, the output from, say correlation mixer 61, should this time delay represent the time for a signal to be transmitted to the target and return, is of a doppler frequency proportional to target radial velocity. The target return will not correlate with the phase history at any other time delay taps, thus the outputs of the correlation mixers 62 and 63 associated with these taps will contain the full transmitted spectrum and are therefore effectively zero. The output, for example, from the target sensing correlation mixer 61 is transmitted via electrical connection 69 to a doppler filter bank 71. The doppler filter bank has a plurality of doppler band pass filters which provide coherent integration and act as speed gates. The precise radial velocity will appear as an output 72 of the doppler filter bank 71. Should the time delay signal match the delay present in electrical connections 68 and 69, then the coherent mixers 62 and 63 respectively would transmit the signal information via electrical connections 73 and 76 to doppler filter bank 74 and 77 respectively. The output signals from doppler filter bank 71, 74 and 77 can be followed by suitable detection and post-detection integration in a manner not shown. As can be seen from this figure, one bank of speed gate filters 71 and 74 or 77 is associated with each time delay tap; the number of both depending upon the desired resolution and information rate. The use of narrow band doppler filters would be necessary to obtain,high processing gain. The simplified system described with reference to FIG. 2 can be further implemented to achieve frequency compression ratios, that is, transmitted bandwidths to final bandwidth of greater than 60 db compared with matched frequency compression devices which can yield no more than 30 to 40 db of processing gain. Because the transmission is broad band noise, the radar embodying the above design is extremely difficult to detect. The utilization of the broad band noise in coordination with a maximized antenna capture area and efficiency makes the system illustrated in FIG. 2 a silent radar within the self-protection shell when operated with the proper signal levels.

Figure 3:
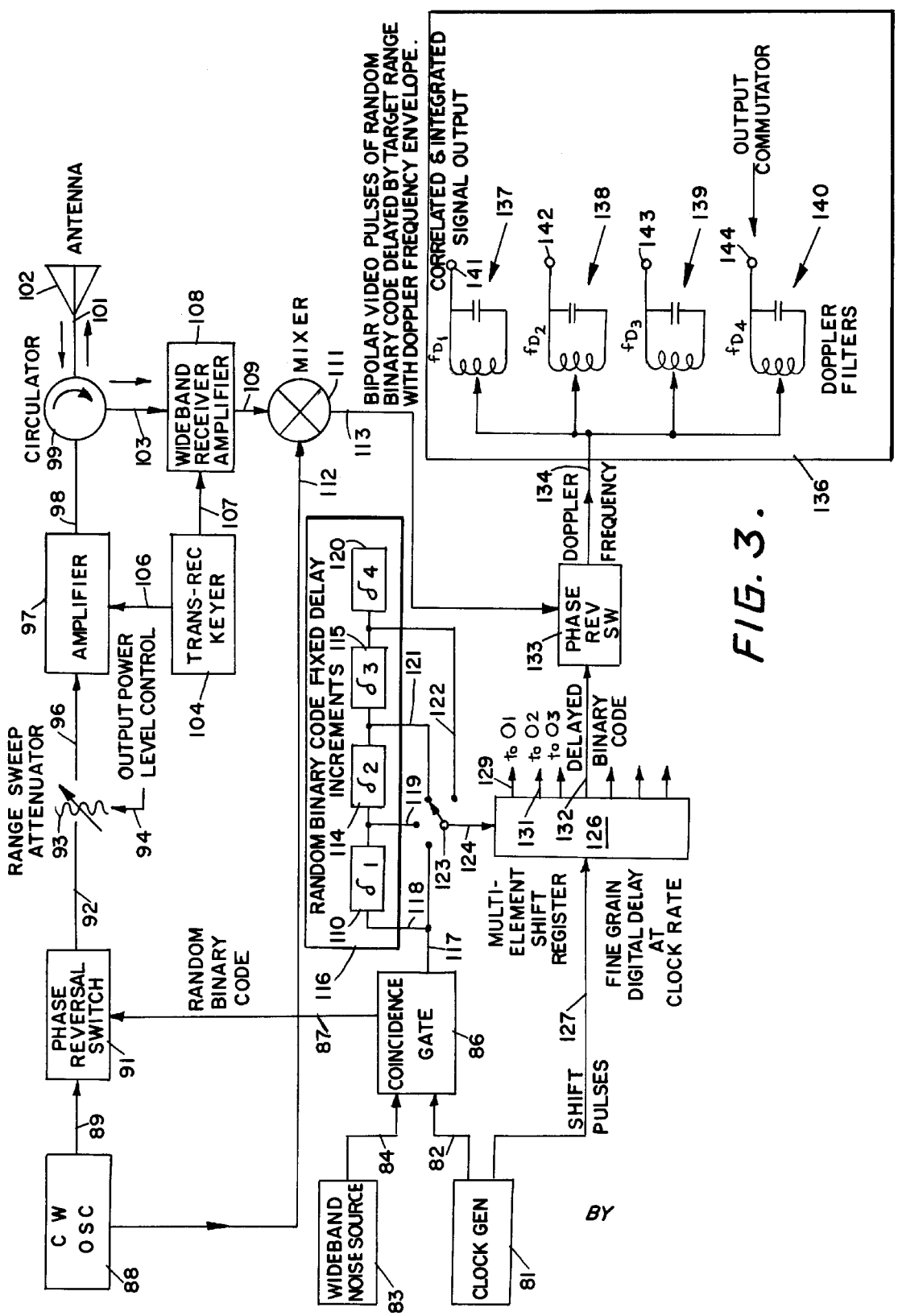
FIG. 3 depicts one manner of implementing the invention.

Referring now to FIG. 3 which illustrates more specifically and in greater detail a typical system which employs the basic elements set forth in the description of FIG. 2 but includes a system which can operate in a silent mode. In FIG. 3, clock pulse generator 81, for example, is designed to operate at a 1 megacycle repetition rate. This clock pulse generator 81 serves to synchronize the system's operation and triggers the basic noise spectrum required. While for purposes of describing FIG. 3, the clock pulse generator is described as having a 1 megacycle repetition rate, this specific rate is not essential to the basic concept of the inventive system. In fact, any frequency consistent with a specific mission of a particular system may be employed. Therefore faster rates improve range resolution but introduce additional demands on other components in the system. Accordingly, selection of rates other than 1 megacycle in combination with changes in other system operating parameters in no way changes the silent mode concept of operation of the invention. The clock pulse generator 81 can be any form of electronic circuit, electro-mechanical, sonic, or electro-optic device which will produce pulses at the required pulsed rate. Crystal driven multi-vibrators are typical of electronic circuits commonly used for this purpose.

There is provided a wide band noise generator 83 which can, for example, produce random "white" noise in a spectral band from approximately dc to 1 megacycle over a 1 megacycle band width. The purpose of the noise produced by wide band noise generator 83 is the generation of the system's random code signal. The noise output from noise generator 83 need not be completely random for system operation. In fact, the noise spectrum output from noise generator 83 may require shaping, that is, frequency weighting, in order to compensate for various non-random operations such as the presence of regular clock pulses which are performed on the signal before it is transmitted. Accordingly the output of noise generator 83 may be shaped to produce a noise spectrum which varies in amplitude across the noise band width, in the instant case for example, 1 megacycle. Such a shaped spectrum will produce a system transmitted noise spectrum which is flat across the bandwidth and as will be seen hereafter, this presents an optimum output signal for silent mode operation. As has been noted, the noise bandwidth need not be 1 megacycle but can be narrower or wider. In the instant embodiment, the 1 megacycle bandwidth has been selected to be complimentary to the selected 1 megacycle clock pulse rate from the clock pulse generator 81. With a 1 megacycle clock rate, a 1 megacycle noise bandwidth is the minimum which can be used to produce completely random system output signals. Narrower noise bandwidths would cause a deviation from complete randomness. On the other hand, wider bandwidths produce complete randomness but may require complexities in subsequent implementations of the system. It is therefore clear that fully random operation occurs when the noise bandwidth matches or is greater than the pulse repetition rate of clock pulse generator 81.

As has been noted, though, shaped noise in some instances may be more desirable than completely random noise in some applications. The noise generator 83 may be selected from one of several electrical devices that will produce the required bandwidth of noise. Typical electrical circuits include crystal diode devices, glow discharge tubes, thermionic diodes, noise lamps and any other suitable noise source. A coincidence gate circuit 86 receives simultaneous electrical signals from clock pulse generator 81 and noise generator 83 via electrical connections 82 and 84 respectively. The coincidence gate circuit 86 effectively compares the clock pulses from pulse generator 81 with the noise generator 83 to produce in electrical connection 87 a train of pulses which constitute a noise modulation signal. Accordingly, the coincidence gate circuit 86 samples the noise signal from noise generator 83 each time it receives a clock pulse via electrical connection 82 from pulse generator 81. The output from the coincidence gate circuit 86 will be a positive pulse if the noise at the instant of sampling is positive, or a negative pulse if the noise is negative. Thus, the pulse train appearing in electrical connection 87 from coincidence gate circuit 86 will contain random positive and negative pulses with widths varying randomly in multiples of 1 microsecond or transitions from positive to negative, or vice versa. These will occur coincident with the leading edge of a clock pulse from pulse generator 81. The amplitude of all pulses appearing in electrical connection 87 will be constant and set by the circuitry of coincidence gate 86 and/or the amplitude of the clock pulses from pulses generator 81. The sampling and pulse generating functions of coincidence gate circuit 86 are not changed by the use of different clock pulse rates from pulse generator 81 or noise bandwidths from noise generator 83. The coincidence gate circuit 86 will still use inputs from pulse generator 81 and noise generator 83 to produce the most random pulse train possible, constrained only by the lack of randomness inherent in a given combination of signals from pulse generator 81 and noise generator 83. The coincidence circuit can take the form of one of several different devices which are capable of sampling and comparing. These include conventional AND gates and flip-flop circuitry. It should be understood that an additional circuit could be inserted in the electrical connection 82 between the pulse generator 81. and the coincidence gate circuit 86 to "jitter" the clock pulses from pulse generator 81 in a random, pseudo-random, or other coded manner. This will produce an output from coincidence gate circuit 86 which alternates from positive to negative in a random, pseudo-random, or coded fashion with respect to the leading edge of pulses from generator 81. This additional randomizing may find specific usages in different modes of silent operation to which this system may be applied.

Directly above the noise generator 83 there is depicted a continuous sine-wave oscillator 88 which produces the system's "carrier" frequency. In the instant system, the oscillator 88 produces a 300 megacycle signal, but other frequencies are of course possible. The sine-wave oscillator 88 may be a typical oscillator device which may include by way of example only, microwave, sonic, or optical oscillators. Electrically connected to the CW oscillator 88 via electrical connection 89 is a phase reversing switch 91 which changes the phase of the CW signal from oscillator 88 between 0 and 180° as commanded by the random pulse signal appearing in electrical connection 87 from coincidence gate 86. Basically, the phase reversing switch 91 may take the form of any suitable unit which can change the phase as required on command of a pulse signal. The phase reversing switch 91 constitutes a phase modulator which changes the phase of the carrier signal from oscillator 88 as commanded by the random pulse signal delivered via electrical connection 87 from coincidence gate 86. The output that appears on electrical connection 92 from the phase reversing switch 91 contains random phase shifts and has the characteristics of random noise in a bandwidth of approximately 1 megacycle. The signal output just noted from phase reversing switch 91 is fed via electrical connection 92 to a range sweep attenuator 93. The function of this attenuator is critical to the ultimate operation of the system as a silent operating radar, and the function of this attenuator 93 will be covered in greater detail as the system is described in this figure and subsequent embodiments. As has been pointed out earlier, the attenuator provides the important function of introducing more attenuation at close ranges of an intercept target to keep the signal output power at a level which permits the system to detect the target at that range, but not sufficient to permit the target to detect the radar system. As the search range is increased, the range sweep attenuator 93 produces less attenuation, thereby permitting greater output power but still maintaining the systemt's detection advantage over targets at the range being searched. It is important to note that the range sweep attenuator 93, insofar as the invention is concerned, need not be located where it is shown on the diagram in FIG. 3. It could alternately be located between oscillator 88 and phase reversing switch 91 or on the other hand, between amplifier 97 and a circulator 99, both of which will be described hereafter.

The range sweep attenuator 93 schematically shown in this figure can be any type of attenuator with the required bandwidths and capability of being programmed via the electrical connection 92. In accordance with the systems range search pattern, such programming can be manual with an operator making the selection of the desired output power, or the programming may be automatic and synchronized with the system's range and/or azimuth search pattern. This programming may be either analog or digital and can include information feed-back such that the detection of a target automatically sets the power level at a desired value for the target's range and/or azimuth. These aspects of the invention will be covered more fully hereafter.

While the embodiment of the invention set forth in FIG. 3 depicts the power level of the modulated signal being changed by an attenuator 93, this is not the only method that might be employed to control the system's power output. For example, the output of oscillator 88 could also be controlled, thereby providing an alternative method of system output power programming.

Electrically connected via connection 92 and 96, amplifier 97 increases the final output signal to the antenna system 102. This amplifier 97 increases the system's output power level. It can also serve as a point of control for the output power level programming. In this function, amplifier 97 can serve as an alternative to the use of range sweep attenuator 93. The amplifier 97 can be any suitable amplifier with an appropriate center frequency bandwidth and gain characteristics needed for any given system. There are contemplated applications for the silent mode of operation of the radar system being described which may not require the inclusion of amplifier 97 in the system, the silent mode of operating being in no way altered by the elimination of the amplifier 97.

Electrically connected to the amplifier 97 via electrical connection 98 is a circulator 99 used as a duplexer to permit transmission and reception over the same antenna system via electrical connection 101 to antenna system 102. As has been pointed out, a separate transmission and reception system with related antennas may be employed, thereby eliminating the need for the circulator 99 employed in this embodiment of the invention.

The antenna 102 which radiates the system's output signal and receives the echo return can be one of many different antenna systems. If transmission and reception are to be done by separate antenna systems, an isotropic radiator can be used for transmission or an antenna can be used to direct the system's output power into a given solid angle. The receiving antenna function can also be performed by antennas of several different types. However, of importance to the invention, the receiving antenna must be optimized for the system's bandwidth and center frequency to thereby afford maximum efficiency. Along the same vein, the antenna should also have the maximum possible capture area in order that the maximum advantages be obtained while the system is functioning in the silent mode of operation. The receiving antenna can be a single or multiple beamed phased array with suitable means to perform this function to obtain maximum information rate.

Electrically connected to the amplifier 97 via electrical connection 106 is a transmit/receive keyer 104 which serves to limit the duty cycle of the amplifier 97 and thereby control transmitter and receiver blanking. The keying rate of the keyer 104 can be constant or can be jittered to reduce the probability that the equipment operator in an intercept target could hear the keying rate. Of course, if transmission and reception are done by separate isolated antennas, the keyer 104 may not be required since blanking would not be necessary. The receiver blanking takes place via electrical connection 107 to the wide band receiver amplifier 108. Directly beneath the keyer 104 in the diagram, FIG. 3, is an incremental delay device 116 for delaying the random pulse signal carried by electrical connection 117 from the coincidence gate 86. The incremental delay device 116 is needed to preserve the system's transmitted signal phase history. The random pulse from coincidence gate 86, so delayed, is used in the system's processing of target returns to serve as a range gating signal and reference signal for subsequent correlation. In this embodiment, the incremental delay device 116 is composed of several acoustic delay lines 110, 114, 115 and 120. These acoustic delay lines offer selection of coarse delays which may be considered coarse range gates. The delay output taps 118, 119 and 121 of incremental delay device 116 can be sampled sequentially by sequential sampler 123 in accordance with the system's range search program. These delay output taps could also be monitored in parallel if such would be desirable for a specific mission. While the incremental delay device 116 has been designated as composed of acoustic delay lines, other suitable delay devices could readily be employed. Accordingly, the use of a digital shift register, tapped distributed-constant delay line, mechanical drum, mechanical tape, storage tube or optical devices could be employed. The incremental delay device 116 could also be a continuously variable delay mechanism such as a "trombone" coaxial line instead of an incremental delay device. Such a continuously variable delay might find application in certain operations where continuous range tracking is required.

At this point it should be recognized that if the system's random noise output were generated by a pseudo-random code generator triggered by pulses from a clock pulse generator such as clock pulse generator 81, a single delayed pulse could be passed to an identical pseudo-random code generator in the receiver which would produce the required code for correlation with a target echo return. This arrangement is, of course, not depicted in FIG. 3 but is a suggested modification that could be employed. The identical pseudo-random generator could have many stages and could thus produce a code which would repeat only after many millions of pulses. Signals phase modulated by such a code would appear completely random when observed for short periods. This method of pseudo-random coding, delay and decoding, is an alternative to the use of the completely random noise as modulation for the silent mode of operation of the radar system embodying the invention.

A second delay device 126 receives the output 124 from the sequential sampler 123. This second delay device 126 adds a more precise range capability to the system. This unit 126 establishes fine range gates which are observed in parallel to subdivide the coarse range gates from incremental delay device 116. In this embodiment, the second delay device 126 has range delay taps 129, 131, 132 spaced to provide one microsecond range gates. This is provided by the electrical shift pulse connection 127 from the clock generator 81. Another range gate increment could be used and any number of taps can be employed to compliment the system's data rate.

The wide band receiver amplifier 108 that accepts the return echo signal from the antenna system 102 through circulator 99 amplifies this echo return and applies it via electrical connection 109 to the mixer 111. The mixer 111 is a coherent mixer that beats the echo return from the receiver 108 with a sample of the CW signal carried along electrical connection 112 from the CW oscillator 88. This mixing converts the received signal to a video signal for amplification and processing. The signal must be coherent in order to preserve the returned signal's phase relationship to the transmitted signal, thus preserving the doppler information carried on the return echo signal. Also such coherent mixing is an aid to the detection process since it allows the system to coherently integrate signals before detection and thus it increases the system's ability to detect targets.

While the presence of coherent mixing as just noted is a distinct aid, as noted, the silent mode of operation is not altered if non-coherent mixing such as a mixing which relies on an independent local oscillator is used. In this latter case, operation will be degraded by a loss of some detection advantage over the target and a loss of doppler information collection capability. However, several alternative approaches are possible and these would involve the use of separate local oscillators which are phase locked to the transmitting oscillator 88 and these would allow coherent mixing with the concomitant advantages noted earlier.

The output from the mixer 111 as it appears in the electrical connection 113 is a train of random bi-polar video pulses which is a replica of the random pulse noise train from coincidence gate 86 originally used to modulate the CW signal from oscillator 88 prior to transmission. However, the pulse train now carries doppler information in the form of an amplitude modulation envelope.

The received signal is correlated with the delayed random pulse signal's phase history in a series of correlation mixers referred to as phase reversing switch 133. Only one of these phase reversing switches has been depicted in this illustration, but it is to be understood that for each of the range delay taps 129, 131 and 132 as well as the other taps illustrated, a phase reversing switch such as 133 will be needed to provide the correlation function. The particular phase reversing switch will receive the random pulse signal with a delay that matches the out-and-return time of the target echo and produce an output signal which is the doppler frequency with no phase reversals. The received signal will not correlate properly with the delayed wave form in any other phase reversing switch. It should be noted, of course, that only one phase reversing switch 133 has been depicted here. Therefore, the output of all other phase reversing switches not shown will be essentially zero. By knowing which switch will produce an output, the system will know the delay time used to correlate the target return and therefore the target's range. The output of each phase reversing switch such as that carried on electrical connection 134 is applied to a separate doppler filter bank 136. Of course, this figure illustrates only one of the many filter banks that would be required in the actual system. Within each filter bank such as filter bank 136, the signal is applied to a number of narrow band pass filters 137, 138, 139 and 140 which are connected electrically in parallel.

The center frequency of each narrow band filter just noted is arranged such that the parallel combination of filters covers the doppler frequencies expected from targets of interest. Since doppler frequencies carry information about a target's radial velocity, each filter is a speed gate and produces at its output 141, 142, 143 or 144 a signal indicating presence of a target with radial velocities corresponding to that filter's frequency range. The narrow band filters of the filter bank 136 also serve the purpose of pre-detection coherent integration to improve the received signal's signal-to-noise ratio and improve the system's detection capability. Therefore, the narrow band filters 137, 138, 139, 140 or the filter bank 136 are essential to achieve high processing gain. The outputs 141, 142, 143 and 144 can be applied to detectors where the signal will be converted to pulsating dc. These signals can then be applied to networks with suitable relatively long time constants for post-detection integration to further improve detection capabilities of the system. Then the outputs from all filters can be commutated and applied to suitable display, computing, or other equipment. Alternative methods of processing the signal once it has left the phase reversing switch 133 are available without altering the silent mode of operation contemplated by the embodiment of the invention just described.

Silent Mode Operation with Wider Bandwidths

The system examples described with reference to FIGS. 2 and 3 are designed to transmit and process power with a spectral bandwidth currently limited to tens of megacycles. However, it is desirable to transmit even wider bandwidths since this ability will give the radar several advantages which include greater detection range, less probability of being detected, faster detection time, fewer doppler filters, and better range resolution. The silent method of radar operation utilizes the spreading of energy over a bandwidth which results in a certain low value of energy at any specific single frequency in the bandwidth. In other words, a low value of energy per cycle. It is this value of energy per cycle which the radar must keep low to avoid detection by the target. On the other hand, the radar itself must receive a certain energy level in order to detect the target. This trade-off itself can be reversed in favor of the radar because the radar can be designed to acknowledge the total energy transmitted even though spread over a wide spectrum. This is possible because the ground, ship or large aircraft-based radar can use cross-correlation detection techniques as described in FIGS. 2 and 3. It is important to recognize that the ground, ship or large aircraft-based radar is not strictly limited by energy per cycle considerations but rather by the total amount of energy transmitted. The target's receiver, however, depends more on energy per cycle considerations for detection. Low values of radar signal's energy per cycle coupled with a given natural noise energy density, that is, noise energy per cycle from the receiver's antenna front end, and space, coupled with the intercept receiver's band-width and scanning characteristics, set the target's receiver detection capability. From these considerations it can be seen that this radar, operating in a silent mode, receives definite benefits by spreading its total output energy over as wide a spectrum region as possible. If, for example, radar transmitter total output power is held constant but the transmitted signal is spread over a wider spectrum and the target's receiver noise level remains constant, the target will be less able to detect the radar's signal since the energy per cycle value is lower. If radar output power is increased and also spread over a wider spectrum to hold the energy per cycle value constant, detectability is not increased but the radar derives many other advantages. Such greater total transmitter power allows the radar greater detection range, or the same detection range with shorter detection time. In addition, it permits the use of fewer doppler filters and also provides greater range resolution. The ability to spread this transmitted power over greater bandwidths gives the radar operating in the silent mode improved performance which can be traded among the several different desirable parameters set forth above. The embodiments of the invention set forth in FIGS. 2 and 3, as has been noted, are currently limited to bandwidths of up to 10 megacycles because of various technical difficulties including the difficulty of producing wideband digital delays.

Figure 4:
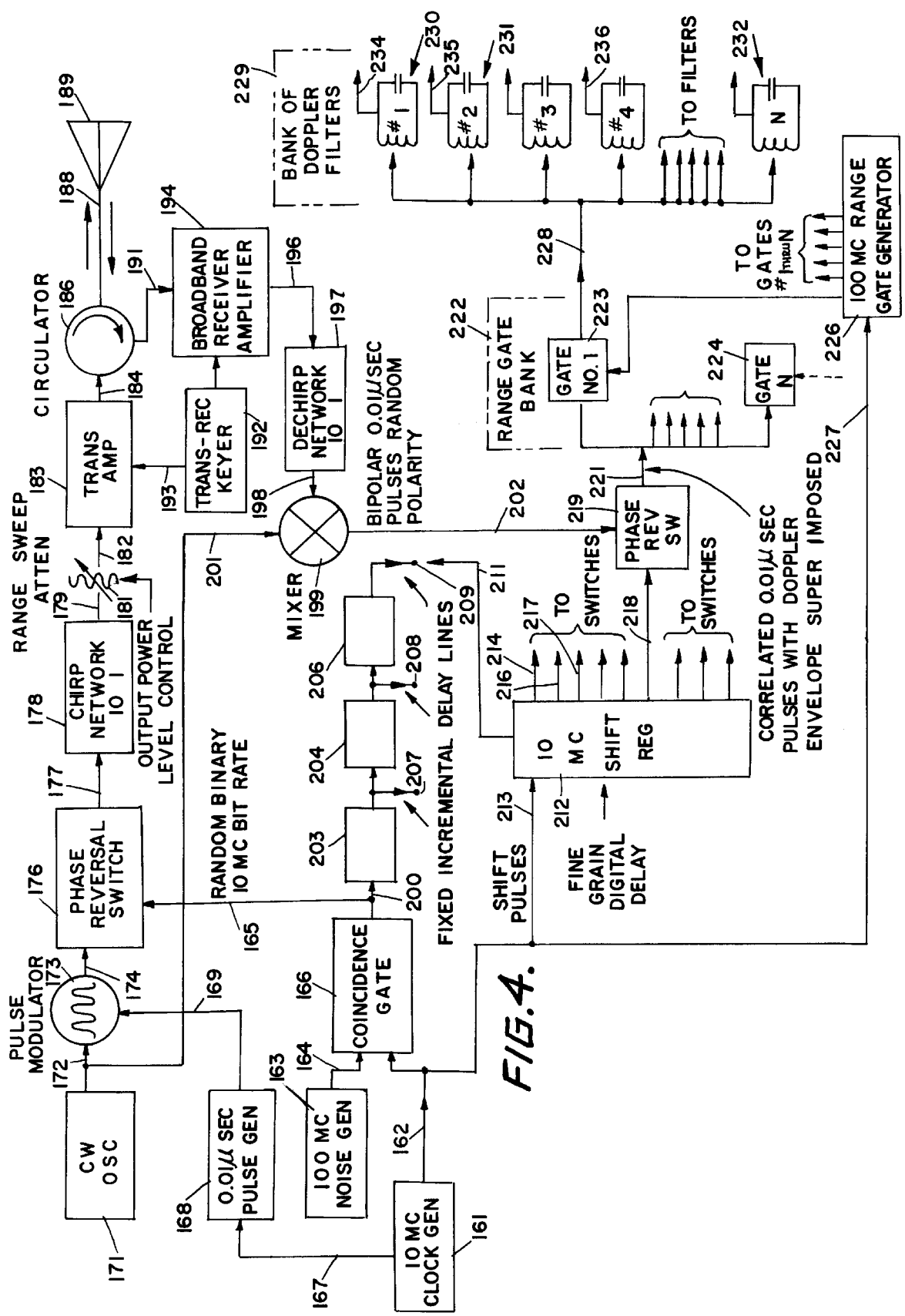
FIG. 4 depicts an embodiment of the invention utilizing very wide band output.

The system to be described as set forth in FIG. 4 embodies the invention and further the system of FIG. 4 is capable of producing varied wide output energy spreads. In addition it employs digital delays with bandwidths narrower than the transmitted bandwidths. The embodiment of the invention as set forth in FIG. 4 obtains its very wide band output by incorporating several processes, each capable of spreading the signal over a wide spectrum region. Specifically, these processes include modulating the CW oscillator carrier frequency with very fast pulses, for example, 0.01 microsecond. Another process to be employed is reversing phase 180° in a random manner controlled by a 10 megacycle clock, and finally passing the signal to be transmitted through a frequency dispersive network, now commonly referred to as "chirped" radar. The above factors will produce relatively wide band signals when used individually. Used together, when spectrum spreading properties are added, they result in a very wide band output. Even though some of the transmitted waveform is regular, i. e. chirp, randomizing the phase at the rate at which a chirp is produced insures a completely random spectrum. For example, a chirp signal of 100 MC bandwidth occurring at a 10 MC rate will exhibit a spectrum 100 MC wide consisting of coherent lines 10 MC apart. By randomizing the 10 MC sequence, those coherent lines disappear into a completely continuous random noise spectrum 100 MC wide, thus making it impractical for any intercept receivers to correlate the signals from the invention.

With reference now to FIG. 4, there is illustrated a system which embodies the frequency spreading techniques pointed out above in a radar that has a silent mode of operation. In this figure, 0.01 microsecond pulses which emanate from a 10 megacycle clock pulse generator 161 are used to modulate a CW carrier frequency to be described more fully in detail hereafter. This system depicted in FIG. 4 will be described in broad terms of operation at the outset and then the specific mode of operation will be pointed out in detail.

A 10 megacycle generator 161 is used to modulate a CW carrier frequency, then a random noise pulse train from a coincidence gate 166 controls via electrical connection 165 the phase reversals in a phase reversing switch 176 at a completely random rate. Finally a frequency dispersive network referred to as Chirp network 178 spreads the signal over an even greater spectrum width with the characteristics of the spread depending on the exact characteristics of the Chirp network. The result is an output spread over a spectrum width of approximately 100 megacycles in this example. This signal is transmitted toward the target and an echo return is received. The echo return is passed through a de-Chirp network which performs as the exact opposite of the Chirp network originally used to spread the signal. The de-Chirp signal is then translated to a video signal by mixing with a sample of the original CW oscillator signal. The video signal is then applied to a phase reversing switch and correlated with a delayed random noise pulse train in a fashion similar to the delay and correlation produced by the systems of FIGS. 2 and 3. If the echo return time matches the delay time of the random noise pulse train, correlation will occur, and the 0.01 microsecond pulses will be reacquired with a doppler envelope superimposed. This signal is then applied to several pulse range gates in parallel. One set of range gates follows each phase reversing switch. A 100 megacycle range gate generator driven by the 10 megacycle pulse generator 161 noted earlier, generates a sequence of range gate pulses to activate the range gates. A bank of narrower band doppler filters follows each range gate to serve as a speed gate for determining the target's radial velocity. It is important to recognize that a key feature of the system illustrated in FIG. 4 lies in the method of implementing the silent mode of operation in the radar and that 100 megacycle spectrum spreading can be obtained even while using a device with only a 10 megacycle bandwidth to delay the random noise signal from the coincident gate.

Now taking up FIG. 4, there is shown in treater detail the system wherein a clock pulse generator 161 operates at a repetition rate which in this instance is 10 megacycle. The clock pulse generator 161 serves to synchronize the system's operation and to trigger the basic noise spectrum required. The frequency of the clock pulse generator 161 need not be 10 megacycles, but, of course, the frequency selected must be consistent with the specific mission of the particular silent radar system. The clock pulse generator 161 can take the form of any suitable device such as an electronic circuit, an electro-mechanical or electro-optic device which will produce pulses at the required fixed rate. The pulse rate from clock pulse generator 161 is transmitted via an electrical connection 162 to a coincidence gate 166. Simultaneously, a signal from noise generator 163 is transmitted via an electrical connection 164 to the coincidence gate 166. The noise generator 163 is selected to produce random white noise in the spectrum band from approximately dc to 10 megacycles over a 10 megacycle bandwidth. The purpose of the noise produced by the noise generator 163 is the generation of the system's random output signal. The most desirable form for the noise is that of a completely random output signal, but the noise output from noise generator 163 need not be completely random for proper system operation. In fact, the spectrum output from noise generator 163 may require shaping, that is, frequency weighting, in order to compensate for various non-random operations, e. g., regular clock pulses performed on the signal before it is transmitted. That is, the output of the noise generator 163 may be shaped to produce a noise spectrum which varies in amplitude across the noise bandwidth. Such a shaped spectrum will produce a system transmitted noise spectrum which is flat across the bandwidth which is an optimum output signal for the silent mode of operation. The coincidence gate 166 effectively compares the clock pulses from pulse generator 161 with the random noise from the noise generator 163 to pass a train of pulses which appear in electrical connection 165 and which constitute a noise modulation signal. The coincidence gate 166 samples the noise signal from noise generator 163 each time it receives a clock pulse from generator 161. The output from the coincidence gate 166 will be positive pulses if the noise at the instant of sampling is positive, or negative pulses if the noise is negative. Thus, the pulse train output from the coincidence gate 166 will contain positive and negative pulses with widths varying randomly in multiples of 0.01 microseconds on transmissions from positive to negative or vice versa, and will occur coincidence with the leading edge of a clock pulse from generator 161. The amplitude of all the pulses which appear at the output of the coincidence gate 166 will be constant and set by the circuitry of the coincidence gate 166 or the amplitude of the pulses from clock pulse generator 161. The sampling and pulse generating function of the coincidence gate 166 is not changed by the use of different clock pulse rates from generator 161 or differing noise bandwidths from noise generator 163. The coincidence gate 166 may be of the same type specifically set forth with reference to FIGS. 2 and 3. Electrically connected to the clock generator 161 via electrical connection 167 is a pulse generator 168 which can produce 0.01 microsecond output pulses each time it receives a pulse from the generator 161. The pulse generator 168 functions to generate very fast pulses which have a wide band spectrum. This pulse generator 168 can take the form of any typical circuit commonly employed for production of fixed duration pulses. Typical devices for this purpose include monostable multi-vibrators, block oscillators, avalanche transistors, and various diodes. Directly above pulse generator 168 in FIG. 4, there is depicted a continuous sine wave oscillator 171 which produces the system's carrier frequency. The oscillator 171 may be any suitable type of oscillator device or circuit including microwave and optical oscillators. Electrically connected to the continuous sine wave oscillator 171 via the electrical connection 172 is a pulse modulator 173 which accepts the continuous signal from the sine wave generator 171 and modulates it with the 0.01 microsecond pulses from pulse generator 168 via the electrical connection 169. The output which appears in electrical connection 174 of the pulse modulator 173 is therefore a signal which has a carrier frequency set by the sine wave oscillator 171 and is modulated by the 0.01 microsecond pulses at a 10 megacycle repetition rate. This signal is then applied to the input of a phase reversing switch 176. The phase reversing switch is controlled by the random noise pulse signal appearing in electrical connection 165 from the coincidence gate 166. That is, when the phase reversing switch 176 receives a negative (zero level) pulse from coincidence gate 166, the switch 176 passes the pulse modulated signal with a 180° phase shift. When the switch 176 receives a positive (1 level) pulse from the coincidence gate 166, the switch passes the modulated signal with a 0° phase shift. It is therefore seen that the phase reversal switch 176 constitutes a phase modulator and can be similar to the phase modulators depicted and described in FIGS. 2 and 3. Since the output from the phase reversal switch 176 which appears in the electrical connection 177 contains 180° phase shifts and very fast (0.01 micro-second) pulses, it occupies a broad portion of the frequency spectrum and has the characteristics of random noise.

This signal is then applied to a frequency dispersive network 178 commonly referred to as a Chirp network. Typical frequency dispersive networks suitable for use in this type of application are described in the following patents to Dicke and Darlington; the Dicke patent being issued Jan. 6, 1953, U.S. Pat. No. 2,624,876 and the Darlington patent issued May 18, 1954, U.S. Pat. No. 2,678,997. The frequency dispersive network provides different time delays for different frequencies, therefore the many different frequencies in the spectrum of the pulse emerge at different times. Consequently the short pulses fed into it are converted to a swept frequency signal of longer duration with appropriate reduction in peak amplitude. In this application, the reduction in peak power can be greater than 10 times. The frequency dispersive network 178 can be a dispersive delay line. It can also be a unit with fixed dispersive characteristics or it can be made with selectable dispersive characteristics, that is, the dispersive characteristics of the Chirp network can be changed according to a code pattern to further reduce the detectability of the radar during its silent mode of operation. The pulse also can be spread by dividing its power among delay lines of various length and re-combining their time staggered outputs. The pulse width is thereby widened and its peak power lowered as before. By selectively alternating the phase of the pulses as they emerge from the individual delay lines, the combined signal output can be coded in the form of the predetermined phase reversals. The output from the frequency dispersive network 178 passes via electrical connection 179 to a range sweep attenuator 181. The range sweep attenuator 181 is a variable attenuator which programs the system's output power according to the range being searched. The attenuator 181 introduces more attenuation at close ranges to keep the system's output power at the lowest level which permits the system to detect targets at that range but is not sufficient to be detected by the target. As the search range increases, the attenuator, 181 produces less attenuation thereby permitting greater output power but still maintaining the system's detection advantage over the target at the range being searched. The attenuator 181 need not be located where shown in the diagram in FIG. 4, but as an alternative as has been pointed out in FIGS. 2 and 3, the attenuator 181 could be located between pulse modulator 173 and phase reversal switch 176. It could also be located between phase reversal switch 176 and frequency dispersive network 178. Finally, it could be located between amplifier 183 and the circulator 186. The attenuator 181 functions in the system now being described in the same manner and with the same functional possibilities as set forth in the description in conjunction with the systems of FIGS. 2 and 3. The output from the variable attenuator 181 in this alternate form passes via electrical connection 182 to an amplifier 183 which is used to increase the system's output signal. It should be noted that amplifier 183 can also serve as a point of control for the output power program. In this function, the amplifier 183 can serve as an alternative to the use of the attenuator 181. The amplifier 183 can be any amplifier with an appropriate center frequency, bandwidth and gain characteristics. There are certain instances in which the amplifier 183 may not even be needed and its absence does not alter the basic concept behind the silent mode of operation. The output from the amplifier 181 passes via an electrical connection 184 to a circulator 186 which is used as a duplexer to permit transmission and reception over the same antenna. As has been noted in FIG. 3, a circulator need not be employed where transmission and reception are done over two separate antennas which thereby eliminate the need for any duplexing device. Depicted in this FIG. 4 directly beneath the transmitter amplifier 183 is a transmit/receive keyer 192 which delivers its output through electrical connection 193 to limit the duty cycle of the amplifier 183, and also to command the transmit/receive switch. The keying rate of the keyer 192 can be constant or can be jittered to reduce the probability that the equipment operator in the target could hear the keying rate. The output from the circulator 186 is fed directly via electrical connection 188 to the antenna 189. The selection of the antenna can be made from any form of antenna with suitable characteristics for a particular silent mode of operation which is determined by the mission to be accomplished. The antenna should, however, be optimized for effectiveness and have a maximum capture area to assure full advantage from the silent mode of radar operation. Electrically inter-connected to the circulator 186 via electrical connection 191 is a broad band receiver amplifier 194 which increases the strength of the echo return from the target and applies the amplified signal via electrical connection 196 to the de-chirp network 197. The de-chirp network 197 has frequency dispersive characteristics which are exactly opposite to those of frequency dispersive network 178. Therefore, de-chirp network 197 acts to transform the long duration pulses of relatively low amplitude to short duration pulses of relatively high amplitude. If the frequency dispersive network 178 has characteristics which can be changed by a code, the de-chirp network 197 must also have characteristics which can be altered according to the same code or program. The compressed output from the de-chirp network 197 which appears in the electrical connection 198 is applied to a mixer 199, where it is beat with a sample of the continuous sine wave signal via electrical connection 201 from the sine wave generator 171. This mixing is coherent and translates the received signal to a video signal for easier amplification and processing. It preserves the returned signal's phase relationship to the transmitted signal so that doppler information contained in the reflected signal is preserved. Also, such coherent mixing is an aid to the detection process and increases the system's ability to detect targets because it allows coherent integration before detection. It should be recognized that the basic operating concept that permits the silent mode of operation is not altered if non-coherent mixing is used. In this case, operation would be degraded by loss of some detection advantage over the target. In the embodiment described, the output from the mixer 199 which appears in the electrical connection 202 is a train of 0.01 micro-second pulses with random polarity.

To the left of the mixer 199 there are incremental fixed delay units 203, 204 and 206 which serve to delay the random pulse signal that is conveyed via electrical connection 200 from the coincidence gate 166 to fixed delay device 203. The random pulse signal from the coincidence gate 166 so delayed thus preserves the system's transmitted signal phase history. The random pulse signal so delayed is used as a range gating and correlation function in the detection process. In this embodiment the fixed delay devices 203, 204 and 206 are exemplary in the sense that the system is not limited to merely three fixed delays as pointed out with reference to FIGS. 2 and 3. A suitable number of delays are contemplated dependent upon the accuracy desired for the system. These fixed delay units 203, 204 and 206 serve the same function as just noted as the delay devices and shift registers shown and described in relation to the system as described in FIGS. 2 and 3. For the system parameters given here (10 megacycle clock repetition rate) units 203, 204 and 206, etc. must have a bandwidth of 10 megacycle or greater. Other delay devices could be used as described with reference to FIGS. 2 and 3.

Directly beneath the fixed delay devices 203, 204 and 206 there is schematically depicted a shift register 212 which provides this system with a precise range capability in that it divides the random noise pulse train from one of the delay taps 207, 208 and 209 into delay increments of 0.1 microsecond. The shift register 212 is controlled by shift pulses on electrical connection 213 from 10 megacycle clock generator 161. One of these connections to the shift register 212 is depicted as an electrical connection 211 which is electrically connected to delay tap 209. It is therefore seen that the taps on the shift register 212 are observed in parallel. The shift register 212 can have as many delay taps as desired to obtain a given information rate. For purposes of illustration only, to the right of the shift register 212 there is illustrated one phase reversal switch 219 which is but one of the many needed for each one of the range delay taps 214, 216, 217 and 218. The range delay tap 218 being shown schematically is electrically connected to the phase reversal switch 219. One phase reversal switch is essential for each of the outputs from the shift register 212 as just noted and all of these phase reversal switches are to be mounted in parallel.

In one of the switches, the echo return will correlate with the random noise pulse signal which has been delayed equivalent to the out-and-return time of the transmitted signal. The return will not correlate in any phase reversing switch associated with a range gate from any other tap on the shift register 212. The output of the phase reversing switch where correlation occurs will be a train of 0.01 microsecond pulses with a doppler frequency envelope superimposed upon it. This signal appears via electrical connection 221. The outputs of the phase reversing switches are then applied to banks of range gates 222, one bank of range gates for each phase reversing switch. Each range gate bank, such as range gate bank 222, will have individual range gates 1 through n. Two of these range gates have been designated as range gate 223 for range gate number 1 and range gate 224 corresponds with range gate n. In order that the range gates be sampled sequentially at the 100 megacycle rate which will be commanded by a range gate generator 226, a signal from the 10 megacycle clock generator is carried via electrical connection 162 and 227 to a range gate generator 226. This arrangement of range gates and the 100 megacycle sequential sampling increases the system's range resolution capability by dividing range time measurements into narrow gates of 0.01 microsecond width. The outputs of each range gate such as gate 223 and 224 are applied to doppler filter banks such as the one illustrated as doppler filter bank 229, there being one doppler filter bank for each range gate. The doppler filter banks are comprised of individual band pass filters such as band pass filters 230, 231 and 232. Each of the band pass filters is to have a center frequency arranged such that the parallel combination of filters covers the range of doppler frequencies expected from targets of interest. Thus, each narrow band filter acts as a speed gate indicating the presence of a target with a radial velocity corresponding to that filter's frequency range. Each of the band pass filters which have been mounted in parallel receive an output signal which appears in this example on electrical connection 228 from a parallel range gate 223. The narrow band pass filters 230, 231 and 232 also provide coherent pre-detection integration to improve the system's detection capability. It is therefore seen that the narrow band filters are important in achieving high processing gain. Each of the band pass filters has an output 234, 235 and 236 which have been designated for purposes of illustration and explanation. These outputs such as 234, 235 and 236 can be detected and applied to various processing, converting and/or display equipment as desired. It should be noted that there are many methods of signal processing that can be utilized after the phase reversing switch 219. There are other combinations of circuits which can be used in the system described without altering the basic inventive concept of silent operation.

Power Programming

The sections that follow will concern themselves with an explanation of the need for power programming as well as the typical means of implementing the control functions. As explained at the outset of the specification, the silent radar system achieves silent operation because it has a signal detection advantage over equipment (intercept receivers) in a typical target. It has been shown that this advantage must and can be great enough to overcome the power loss inequality which is favorable to the target's receivers. That is, the signal transmitted by the silent radar reaches the target having suffered only a one-way path loss proportional to the square of the range ($R^2$) while the radar receives a much weaker echo return which is the result of a two-way path loss proportional to $R^4$. Since the silent radar's detection advantage is great enough to overcome this inequality the radar can be programmed to transmit a signal which is too small for detection by the target but just large enough for the radar to detect an echo return from the target. The result is detection of the target without the target's knowledge and is therefore termed silent detection.

To achieve this silent detection, the radar's output power level must be set to satisfy the two criteria mentioned, that is, the power output must be both below the detection threshold of the intercept receiver in the target and above the radar's detection threshold for the echo return. If too high a power level is transmitted, the first criteria will not be satisfied and the target will be able to detect the radar's signal. If too low a power level is transmitted, the second criterion will not be satisfied and the radar will not be able to detect the target, (even though the target will still not be able to detect the radar). It is clear that the ability to control transmitted power level is essential to any practical silent radar system.

Figure 5:
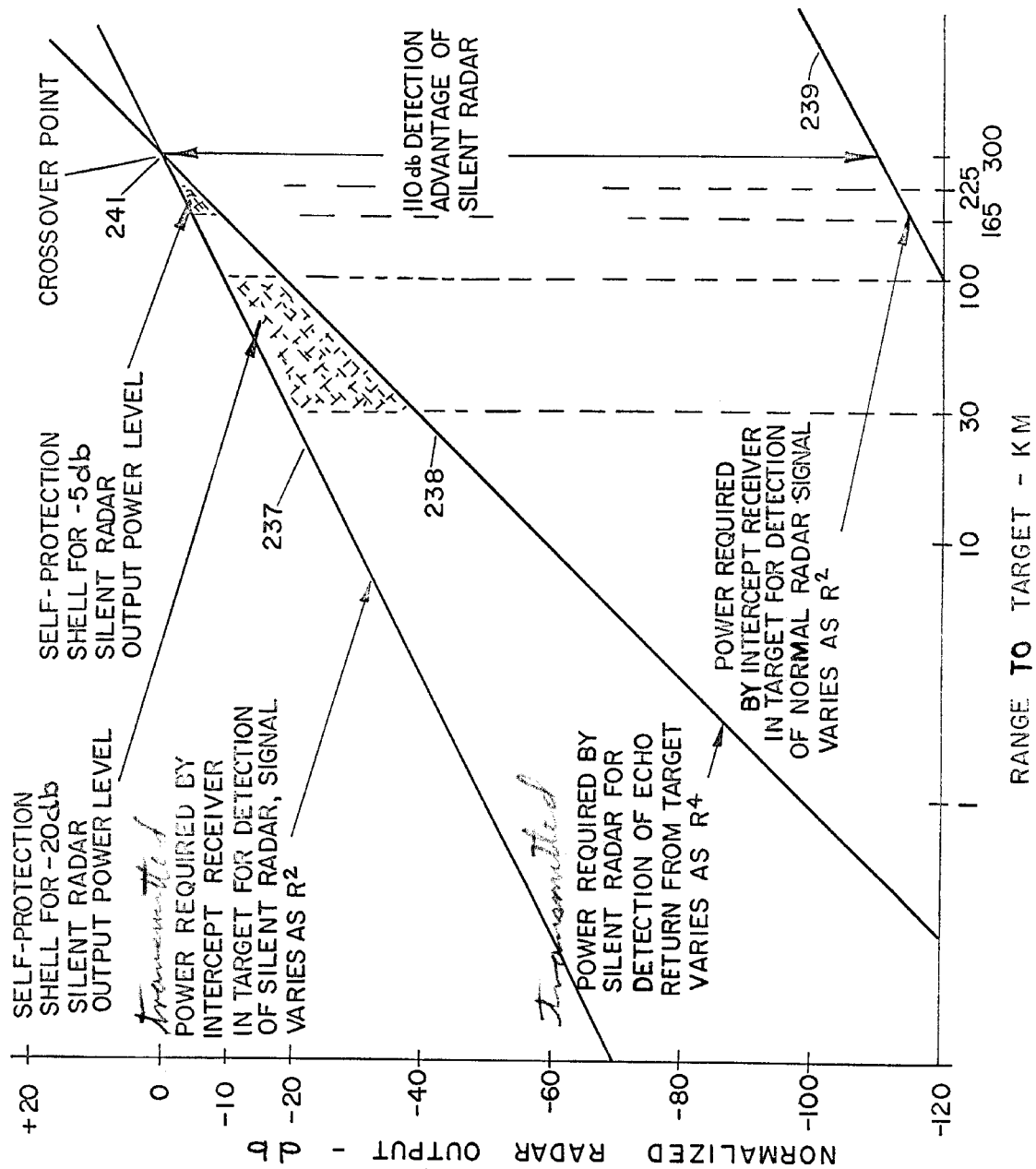
FIG. 5 is a graphical presentation of the parameters involved in a typical silent operational system.

For a given radar output power level within certain limits, there is a range interval over which both silent detection criteria are fulfilled. The size and position of this range interval are functions of both range to target and amount of the radar's detection advantage over the target. FIG. 5 is a graphical presentation of this relationship for the single case where the radar has a 110 db detection advantage over the target. In FIG. 5, the radar's transmitted power Which a target requires to detect the silent radar signal is plotted as a function of range in line 237 and varies as $R^2$. The radar transmitted power which the radar requires for detection over the echo return is plotted as a function of range in line 238 and varies as $R^4$. Line 239 shows the power required by an intercept receiver to detect a conventional higher powered radar signal. If the radar is operating in the region between lines 237 and 238 from 0 to 300 kilometers it will fulfill both criteria for silent detection. However, lines 237 and 238 intersect at a range of 300 kilometers at a point 241 indicating that the radar cannot silently detect targets at or beyond this maximum or cross-over range. That is, the cross-over range is the point where the radar's detection advantage over the target ceases to be greater than the $R^2/R^4$ path loss inequality which is favorable to the target's receiver. If the radar is to detect targets beyond the cross-over range it has to transmit a power level which is high enough to allow detection by the target.

For any point inside the cross-over point, however, there is a defined range of output power which will satisfy the silent detection criteria. Conversely, for any given output power level, there is an interval of range over which both silent detection criteria are fulfilled. With specific reference to FIG. 5, if the silent radar output power level is −20 db for example, silent detection can be achieved for targets anywhere in the range interval between 30 and 100 kilometers. For the 110 db detection advantage case depicted in FIG. 5 the range interval between 30 and 100 kilometers is termed the −20 db self protection shell since it is in the region which the radar can detect without being detected if it transmits this power level.

To silently detect targets at ranges other than those within the −20 db self-protection shell, the silent radar must change its power level to move the shell inward or outward. If the power level is increased from −20 db to −5 db for example, the self-protection shell will move outward to the position shown hatched, allowing silent detection at ranges between 165 and 225 kilometers. The programmed change in radar output power can follow any curve which lies between lines 237 and 238 of FIG. 5. That is, the power versus the range function which controls movement of the self-protection shell can be proportional to any exponential function of range between $R^2$ and $R^4$ in order to obtain optimized radar performance for different applications. If, for example, the power is decreased proportionately to the square as range decreases, the radar will experience improving probability of detecting the echo return as the target moves closer in range. This results because the radar is always transmitting the highest power level possible within the limits of silent operation and as the range decreases, the $R^2/R^4$ path loss inequality becomes less and less unfavorable to the radar. In other words, the radar's detection advantage just equals the path loss disadvantages at the cross-over point, but at zero range the radar's full 110 db detection advantage over the target can be used. If the radar transmits a power level just below the intercept receiver's threshold, (maximum possible power for silent operation) the radar will receive nearly 110 db more signal power than is required from marginal detection when the target is at close ranges. The result will be improved detection probability for the radar as range decreases. If the power program reduces power proportional to $R^2$, in this case the probability of the target intercepting the radar signal remains constant at all ranges out to the cross-over range.

If on the other hand the radar power pro gram follows a curve proportional to $R^4$ the radar's probability of detecting the target will be constant at all ranges, but the probability of the target detecting the radar will decrease as range decreases. In this case the radar is always transmitting the lowest possible power level which allows it to detect the target. Since an absolute detection advantage over the target increases from zero at the cross-over point to nearly 110 db at zero range, the signal will be increasingly below the target threshold as range decreases.

By selection of a power control function between $R^2$ and $R^4$ such as $R^{2.5}$ or $R^3$, etc., the two desirable qualities of increasing detection probability and decreasing intercept probability can be traded to obtain an optimum radar design for a given application. Final selection of the optimum power control function would be based o n operational analysis of the tactical environment in which the radar would operate.

Methods of Implementing the Power Control

The exist various types of instrumentation that can be used to implement the power control function in a silent operating radar of the type just described. As has been pointed out, the point of power control in the radar system can be one of many locations in the transmitter signal path. To meet this end, variable attenuation devices may be used such as ferrite and diode attenuators which can produce attenuation proportional to an electrical controlled current or voltage. Mechanically variable attenuators can also be employed and these may be the vane and resistive loss devices.

Alternative to use of a variable attenuator would be power control schemes operating directly on the oscillators and amplifiers in the transmitter. That is, the gain of these devices could be varied to produce the required output control function. Many ways of controlling and programming the selected power control devices exist. The control may be manual and in this case, the radar operator could control the attenuation device directly by hand or remotely through a gear train or electro-servo system as he observes the radar display and notes the range of the targets. The attenuation device could also be controlled according to a fixed program, that is, the radar might search a volume of space in progressive steps. The programmed search pattern would be servoed to the power control device. For most applications, however, the optimum control technique involves a dynamic closed loop through the target in such a way that information about the target's range is used to command attenuation which steps the proper power level for the silent mode of operation in that range. This type of system thus involves feedback of target range information for the purpose of controlling output power and can be implemented in a digital or analog manner.

In addition to feedback of range information the silent radar can make use of azimuth, elevation, angle and velocity information feedback to increase performance for various applications. Some possible implementations of these dynamic feedback power control systems are described below. A silent radar system can be designed to use only range information for power control. Such a radar might, for example, begin its search program by first examining a close range interval with low power. If no targets are found in the close interval, power would be increased by one step to move the self-protection shell outward to the next further range interval. This procedure will continue until the radar's detection advantage ceased to exist. At this point the range search program could reset the power level for close range search and the complete stepping program would repeat, or the programmer could stop stepping and continue to search the outermost self-protection shell until a target is detected. The arrangement and number of range steps in the program and the number of scans a system devotes to each step would be optimized for maximum detection performance in a tactical environment by operational analysis.

If this type of system detects a target in any of the close range intervals, the detection information would command the radar to stop increasing its search range. As the detected target moved inward or outward, the range information feedback would be used to command incremental (or analog) changes in the radar output power causing the self-protection shell to "track" the detected target. The range information required for this type of operation can be extracted directly from the system's range gate outputs and be processed by logic and memory circuits.

The power control signal can also be obtained from circuitry which measures the signal-to-noise ratio at the radar receiver's output and generates an analog voltage proportional to this ratio. This latter method is similar in operation to automatic gain control circuitry used in conventional receivers. It produces a continuous tracking of the self-protection shell rather than discrete step tracking and is therefore applicable to tracking radar systems.

Search radar systems employing range-only power control have a serious limitation; they can "silently" handle only one target (several can be handled in the rare case where all have approximately the same range). Thus, this type of power control is not optimum for situations involving multiple targets at widely varying ranges since the radar would transmit too high or too low power for all targets other than the one selected as the controlling target. The range-azimuth power control system described below is a solution to this problem.

Range-Azimuth Control

A silent radar can use information feedback from both its range and azimuth search functions to obtain a multi-target "silent" capability. This system automatically sets power at the optimum value for individual targets at different range-azimuth coordinates. That is, detection of a target at a given range-azimuth coordinate in one scan can be remembered and used to set power at the required silent level for the next scan across that individual coordinate. Power can return to maximum for all segments of the azimuth scan containing no targets-to give the radar maximum detection range capability.

Implementation of the range-azimuth type control system requires some form of memory and logic circuitry for storage of data between scans.

With reference now to FIG. 6 it can be seen how volume to be searched is divided into blocks defined by the radar antenna beam width designated by beam width arrow 247 which beam emanates from the ground-based radar 246. This beam width arrow corresponds to the azimuth dimension, whereas the beam height is designated by beam height arrow 248 which designates the elevation dimension. The width of each block is determined by the thickness of the self-protection shell set by the power stepping program and this thickness of the self-protection shell is designated by self-protection shell width arrow 249. Each block is associated with a storage element in a memory logic unit 251 set forth in FIG. 7. Thus, target detection at any range-azimuth coordinate can be remembered between scans. The number of storage elements required is a function of the search volume size and the range and azimuth power control accuracy required by a given application. The memory and logic components such as those depicted in the simplified schematic set forth in FIG. 6 can be typical computer or storage systems and these systems include core arrays, drums, disks, cathode ray tube systems, thin film arrays, chains of active element binary stages, various types of delay lines and RC time constant circuits. With the range-azimuth type of power control systems, power need only be reduced over an azimuth angle approximately twice the antenna beam width to assure an adequate margin of safety.

With specific reference to FIG. 7 there is depicted schematically in block diagram form a range-azimuth control system which could be added to any of the systems described in FIGS. 2, 3 or 4. In this schematic representation, the extensive detail of the transmitter portion of this system 252 is not set forth as it was in the earlier figures. Suffice it to say that the transmitter includes a wide band noise source and the receiver 266 utilizes the correlation techniques and the structures described in the earlier figures. Therefore the function of this closed loop system which includes a direct link with the target functions as follows: The transmitter 252 produces the signal of the type described earlier in the specification. This signal which appears on the electrical connection 253 is fed directly to a signal controllable variable attenuator 254 which attenuator may be of the same type depicted in FIGS. 2 to 4. This variable attenuator and its function have been pointed out earlier. The signal from the variable attenuator is passed via electrical connection 256 to a transmit/receive switch 257 which is shown as a simple switch for purposes of illustration only, and thence to an antenna 258 which sends the signal out to the target, from which a portion is reflected back to the antenna 258. This signal from the antenna 258 of course must be swept through the 360° of the search pattern and this sweeping is accomplished by an azimuth position servo 262 which has a mechanical link 261 to control the rotation of the antenna 258. The signal that appears in electrical connection 263 from azimuth position servo reflects the azimuth position continuously. The azimuth position servo may take the form of an electrical mechanical encoder or an analog device such as a Selsyn transmitter. The output signal that appears in the electrical connection 263 is fed to a memory logic unit 251 which is simultaneously receiving information as to the range of a detected target from electrical connection 269 and range gate 268 which is in turn receiving a signal from the receiver 266 via electrical connection 267. When a target signal appears at the antenna 258 and is transmitted to the transmitter through the transmit/receive switch 257 via electrical connection 264 to the receiver 266 and thence to the range gate 268, there will appear in the memory logic unit simultaneously the needed information for this computer to record the precise position azimuth vs. range of a detected target. The output from the memory logic unit 251 appearing on the electrical connection 271 gives an indication to the range power function generator 272 which emits a control signal to the variable attenuator to control the variable attenuator so that the proper level of power will be transmitted to the antenna 258 in order that the system continue to function in the silent mode.

A further improvement in multi-target capability can be obtained by employing information feed-back from three search functions in radars having multiple beams stacked in elevation. Implementation in this case can be similar to implementation of the range-azimuth type control system depicted in FIG. 7. The search volume can be divided into blocks having range-azimuth and elevation dimensions. In this case a memory logic unit would contain a storage element for each block. Detection of a target in any block would command power pull-back in the appropriate elevation beam as it scans across that range-azimuth-elevation coordinate. All dynamic feed-back systems described above sample the target range on successive scans and adjust power to the level appropriate for optimum silent detection on the next scan. That is, they track the target scan-by-scan updating their memories each time the antenna pattern passes the target. Between scans over the target the radar has no knowledge of changes in the target's range. In some rare instances, this limitation could allow a target to move into a range interval not expected on the next scan. The radar might then transmit the wrong output power for that range. In the most adverse circumstances, the wrong power level could allow detection of the radar signal because the target would have moved close enough to allow detection. If the target had moved away, the radar might lose the target because the transmitted power level would be too low. This problem would probably not arise in most applications of a silent radar system. However, in applications where extremely fast targets are expected and/or radar antenna scanning is very slow or the width of the self-protection shell is very small, it could be a factor detrimental to silent operation. To resolve this problem a silent radar can use information feed-back from its doppler (velocity) sensing function to modify the power attenuation program. That is, the radar's knowledge of the target's radial velocity toward or away from the radar can be used to anticipate target range movement for the purpose of establishing a proper radar output power level. This type of operation would set the proper power level so long as target motion remained essentially uniform in velocity and direction between successive scans.

Output Power Regulation

Since silent operation is critically dependent on output power level, the optimum silent radar system should contain a power regulation system in addition to its power control system described above. The regulation system would assure short term power level stability at the level commanded by the control system. In operation the regulation system would sample the output power level at some point in the transmitter signal path and compare it to a previously fixed representative level. Any difference between these two levels would produce an error voltage proportional to the amount of the difference. The error voltage would be applied to the power control device, that is, the attenuator in the signal path and would thus regulate the power level within a small percentage of the value set by the power control system.

Figure 8:
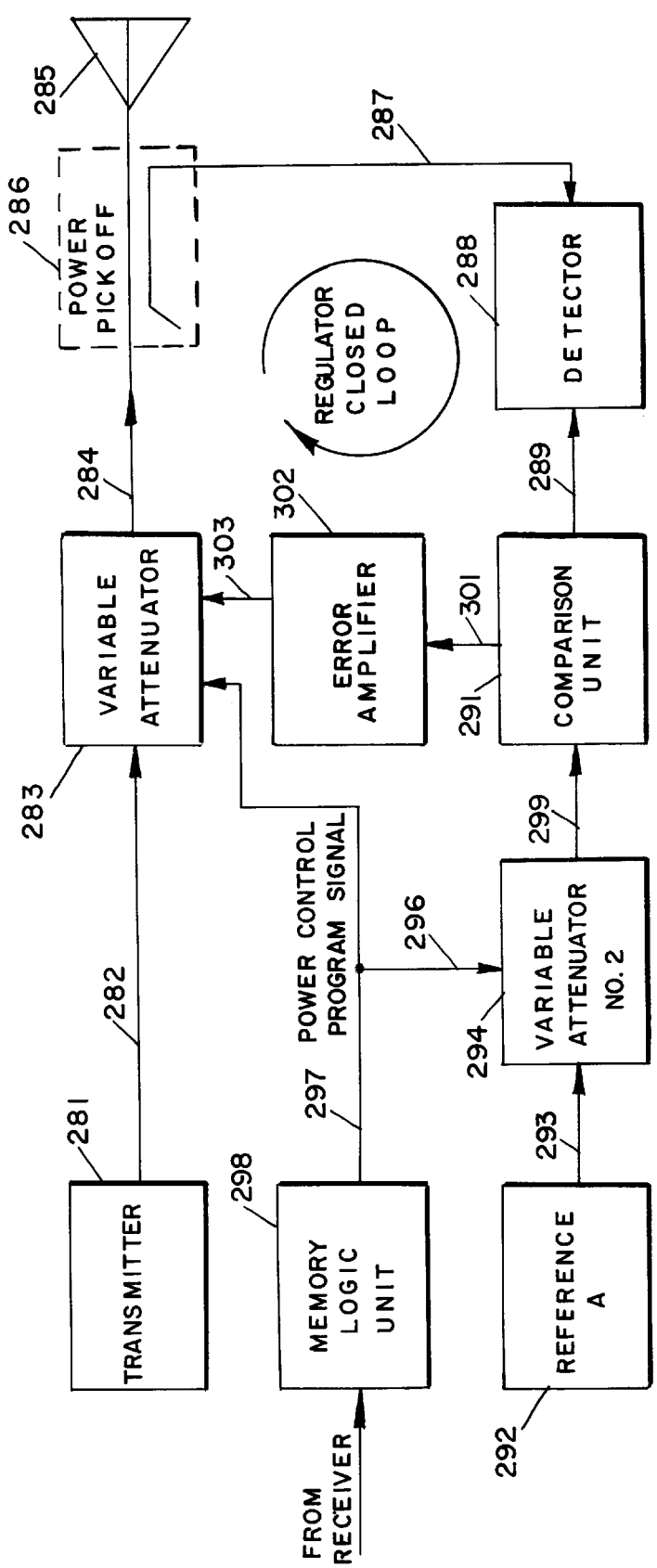
FIG. 8 shows the functional blocks of a typical regulation system.

FIG. 8 shows the functional operation of a typical regulation system. In FIG. 8 the transmitter 281, schematically shown, transmits a signal of a type described with reference to FIGS. 2 to 4 via electrical connection 282 to the variable attenuator 283 which is having its power level controlled by a signal which has come from a receiver which in turn has been fed into the memory logic unit 298. The memory logic unit functions in the manner illustrated in FIG. 7. The output of the memory logic unit is transmitted via electrical connection 297 to the variable attenuator 283. This signal controllable variable attenuator 283 is of the same type described with reference to FIGS. 2 to 4. The output from the variable attenuator then passes via electrical connection 284 to the antenna 285 for transmission toward the target. At a selected point in the transmitter signal path a portion of the signal is taken off by power pick-off 286 which transmits this RF signal via electrical connection 287 to detector 288 which may be a diode device. The detector output appears on electrical connection 289 as a dc output that reflects proportionately the signal picked off the electrical connection 284 to the transmitter path. This dc output is then fed into a comparison unit 291, which comparison unit may be a bridge circuit which is also being fed by a reference device 292 shown to the left of the comparison unit 291. This reference device 292 may be a voltage device that is extremely stable such as a zener diode. The output from the reference device 292 is fed via electrical connection 293 to a variable attenuator 294. This variable attenuator 294 is a simple dc device such as a resistance voltage divider and this variable attenuator in turn has its output controlled by the combined action of the reference device 292 and the signal from the memory logic unit 298 via electrical connection 297 and 296. The output from variable attenuator 294 is then fed directly via electrical connection 299 to the comparison unit 291 where any difference that appears between the signals appearing on electrical connections 299 and 289 will produce an error voltage proportional to the amount of the difference. This error signal or voltage appears on electrical connection 301 and will be amplified in amplifier 302 to increase its amplitude and then be transmitted via electrical connection 303 to the attenuator 283. The attenuator 283 which is in the signal path would thereby regulate the power level within a small percentage of the value set by the power control system. Accordingly, it is seen that the system illustrated constitutes a closed loop regulation system of the series type. The system depicted in FIG. 8 is only one way in which power regulation can be achieved. In fact, the variable attenuator 294 could be located between the detector 288. and the comparison unit 291. It will of course be understood that there are many ways of regulating power which are possible just as there are many possible ways of regulating the power output from the dc power supply, but the basic feature of any regulation system is the incorporation of the closed feed-back loop, one form of which is illustrated in FIG. 8.

Alternatives to the Approaches Described

The basic concept of spread spectrum noise transmission to decrease the energy per cycle value can be implemented as described but alternative implementations are also possible. For example, different types of noise modulation can be used including a time noise modulation in which transmission would be in short bursts of fixed duration (perhaps 1 micro-second) transmitted at random intervals. Or, the CW oscillator could be swept in frequency according to some program to either replace or add to the other methods of spectrum spreading.

Also, the delay and correlation functions could be performed by a variety of devices other than those specifically described. For example, correlation could be done by a tapped delay line with the taps scanned in a programmed fashion. A series-parallel tap arrangement could be used with "ones" and "zeros" tied together. Taps could be scanned sequentially if desired. Many possibilities exist.

Furthermore, frequency diversity techniques could be used with silent radar. Such techniques would employ radar transmissions on two or more frequencies with appropriate circuitry to correlate the target echo returns at each frequency and/or select the optimum return for processing or for its freedom from enemy jamming.

Finally, the silent radar's transmitter antenna nutation or spin rate or search scan rate could be varied in a random manner to broaden the spectrum of the modulation which such scanning imparts to the radar signal. This would reduce the probability of radar signal recognition by the operator of an intercept receiver in the target. That is, the transmitter beam scan rate of a conventional radar is detectable at the target as a usually low frequency modulation of the radar signal. Intercept receivers employ audio filters, displays, and other means for detecting this modulation. Varying the silent radar transmitter beam scanning rate randomly would reduce detectability by spreading the spectrum of the modulation. Or, lobe on receive only, monopulse, or other radar techniques which normally do not employ scanned transmitter beams could be used to eliminate detection of beam scan modulation.

While there has been hereinbefore described what are considered preferred embodiments of the invention, it will be apparent that many and various changes and modifications may be made with respect to the embodiments illustrated without departing from the spirit of the invention. It will be understood, therefore, that all changes and modifications as fall fairly within the scope of the present invention as defined in the appended claims are to be considered as part of the present invention.

What is claimed is:

1. A silent operating radar system having a controllable silent range, within which range another receiver system having set operating characteristics cannot detect the presence of said silent operating radar system, comprising:

A. means for providing optimized radar signal reception of a magnitude greater than said other receiver system, B. means for producing a controlled signal energy spread over a wide bandwidth to thereby establish a low value of energy at any specific single frequency in said bandwidth, said low value, of energy per specific single frequency being less than a level at which said other receiver system with its set operating characteristics can detect while in said silent range, whereby said silent operating radar system is thus afforded a detection advantage over said other radar system because of the combined presence of said optimized radar reception and of said low controlled value of energy per specific single frequency.

2. The system described in claim 1 where said means for providing a controlled signal energy produces signal energy per single frequency that will not be detectable to said receiver system because the inherent path loss between said silent radar system and said receiver system will place said signal below the level of detectability of said receiver system's set characteristics within said silent range.

3. The system described in claim 1, including control means to vary the signal power output to thereby control the distance of said silent range.

4. The system described in claim 3 wherein said control means are controlled by the location of said receiver system in said silent range.

5. The system described in claim 3 wherein said control means has a controlled programmed input to thereby control the silent range covered in a predetermined manner.

6. A silent operating radar system having a self-protection shell, said shell being defined as the volume between two hemispherical shells where said silent operating radar is located at a common center of radii that would be included in both of said shells, said self-protection shell acting as a protector of said silent operating radar when another radar system having set operating characteristics is within said volume defined by said shell, said volume being a function of the output power of said silent operating radar, said silent operating radar comprising:

A. means for providing an optimized radar signal reception capability of a magnitude greater than said other radar system, B. means for producing signal energy spread over a wide bandwidth to thereby establish a low value of energy at any specific single frequency in said bandwidth, said low value of energy per specific single frequency being less than a level at which said other system with its set operating characteristics can detect while anywhere in the volume defined as said self-protection shell, whereby said silent operating radar system is thereby afforded a detection advantage over said other radar system because of the combined presence of said optimized radar reception and of said low value of energy per specific single frequency.

7. The system described in claim 6, including control means to vary the signal power output of said silent operating radar system to thereby alter the volume of said self-protection shell, said control means thereby acting to control the dimensions of said self-protection shell to effectively vary the range within which said self-protection shell will afford silent range operation of said system when said other radar with said set operating characteristics is within the volume defined by said self-protection shell.

8. A silent operating radar system in which the power output of said radar is in part controlled by the position of a target in space, comprising:

A. means for transmitting a signal having a controlled power level such that attenuation of said power output to said target is at a level not discernible by a receiver in said target;

B. means for detecting a target reflected portion of the transmitted signal, such that there is provided a silent operating radar system.

9. The radar system of claim 8 including means for programming said controlled power output level to always maintain said power output level below said level of discernibility in said target receivers.

10. A silent operating radar system in which the power output of said radar is in part controlled by the position of a plurality of targets in space, comprising:

A. means for transmitting a signal having a controlled power level such that attentuation of said output to each of said targets is at a level not discernible by a receiver in said targets;

B. means for detecting a target reflected portion of the transmitted signal, such that there is provided a silent operating radar system.

11. The radar system of claim 10, including means for programming said controlled output level to always maintain said power output level below said level of discernibility in each of said target's receivers.

12. A silent operating radar system in which the power output is of wide band random noise and said radar's power output is in part controlled by the position of a target in space, comprising:

A. means for transmitting a signal of wide band random noise characteristic having a controlled power level such that attenuation due to travel through space by said wide band random noise power output to said target results in said signal not being discernible by a receiver in said target;

B. means for detecting a target reflected portion of the wide band random noise transmitted signal, such that there is provided a silent operating radar system.

13. The radar system of claim 12, including means for programming said controlled wide band random noise power output level to always maintain said power output level below said level of discernibility in said target.

14. The radar system of claim 12 which includes means whereby said power level is controlled by a plurality of targets.

15. The radar system of claim 14 wherein said controlled wide band random noise power output level is programmed to always maintain said power output level below said level of discernibility in each of said target receivers.

16. A closed loop silent radar system having a controlled power output, wherein a target becomes part of the closed loop, said radar system comprising A. transmitter means having a controlled output for sending a signal to said target, B. memory means to store information with reference to said target's range and azimuth, C. a range receiver means receiving a reflected signal from said target and having an output signal fed to said memory means, D. an azimuth position means for controlling scanning having an output signal indicative of its position fed to said memory means, E. said memory means simultaneously receiving both said range receiver means output signal and said azimuth position output signal to produce a controlled signal to said transmitter means to thereby provide a controlled power output which power output is of an optimum level such that the target can be detected but said target cannot detect the presence of said radar system's transmitter means output.

17. The radar system of claim 16 wherein said transmitter includes means for producing a controlled power output of wide band purely random noise.

18. The radar system of claim 16 wherein said memory means output controls said transmitter means to automatically set the transmitted output power at said optimum level for individual targets at different range-azimuth coordinates.

19. The radar system of claim 18 wherein said azimuth signal stored in said memory means will control said transmitter power means to shift the output power to a different level at azimuth positions that have no target.

20. The radar system of claim 16 wherein said range receiver means utilizes cross-correlation to compare a target reflected signal with a known delayed signal to establish the range of said target.

21. The radar system of claim 16 wherein said memory means record continuously the azimuth and range history of said target to thereby provide a continuously controlled output from said transmitter means.

22. The combination set forth in claim 16 and further including means to sample power level in said transmitter means, A. comparison means to compare said sampled power level with a fixed level, said comparison means producing an error signal proportional to the difference between said sampled power output and said fixed level, B. whereby said error signal will control output power to regulate said power output.

23. The combination set forth in claim 22 wherein there is included means to control said reference level as a function of said memory output power control means.

24. The power regulation system of claim 23 wherein said transmitter means controlled power output is of wide band purely random noise.

25. The power regulation system of claim 23 wherein said memory means causes said transmitter means to automatically set power at said optimum level for individual targets at different range-azimuth coordinates.

26. The power regulation system of claim 25 wherein said azimuth position means output signal to said memory means will control said transmitter power output to shift to a different level at azimuth positions that have no target.

27. A silent radar system to detect a target that has radar reception capabilities comprising a clock pulse generator means to provide a train of pulses and a noise generating means to provide a noise signal, A. a coincidence gate means receiving both said train of pulses and said noise signal, said coincidence gate means having a resulting output random noise pulse train signal, B. a continuous wave oscillator means, C. a modulator means being fed a continuous wave oscillator signal input from said continuous wave oscillator means and a random noise pulse train signal input from said coincidence gate, D. said modulator means controlling said continuous wave signal input and said random noise pulse train signal to provide a random phase shifted signal output, E. a variable attenuator means being supplied said random phase shifted signal and controlled by a program means to maintain a system power output that will always be undiscernible to said target with radar reception capabilities, F. transmitter means fed by said variable attenuator means for directing said random phase shifted signal output signal toward said target, G. receiver means for receiving a reflected portion of said output signal from said target carrying doppler information as to said target's velocity and having an output fed to a coherent mixer which mixer has simultaneously fed thereto a continuous wave oscillator signal from said continuous wave oscillator means, H. time delay means being fed a portion of said random noise pulse train from said coincidence gate means, I. said time delay means having stored therein said random noise pulse train history from said coincidence gate means, J. said time delay means having a plurality predetermined time delay taps each representing a different time equivalent to the time a signal from said attenuator output takes to reach said target and be reflected back to said receiving means, K. a plurality of correlation mixers equivalent in number to said time delay taps each being fed simultaneously by said coherent mixers output and one of said time delay taps whereby a correlation output signal will occur only in a correlation mixer that has a random noise pulse train signal that matches said reflected signal with an equivalent time delay, L. said correlation output signal thereby providing an indication of said target and its range.

28. The silent radar system of claim 27 wherein each of said correlation mixers have an output fed to a doppler filter bank means, said doppler filter bank means functioning to extract radial velocity information from said correlation output signal.

29. The silent radar system of claim 27 in combination with

A. a memory means to store information with reference to said target's range and azimuth, B. said correlation output signal with its target range information being fed to said memory means, C. an azimuth position means for controlled scanning having an output signal indicative of its position fed to said memory means, D. said memory means simultaneously receiving both said correlation output signal with its target range information and said azimuth position output signal to vary said attenuator means to thereby provide a controlled power output of an optimum level such that said target cannot detect the presence of said silent radar system output which has been directed toward said target.

30. The silent radar system of claim 29 wherein said memory means output controls said transmitter means to automatically set power at said optimum level for individual targets at different range-azimuth coordinates.

31. The silent radar system of claim 30 wherein said azimuth position means output signal to said memory means will control said attenuator means power output to shift to a different level at azimuth positions that have no target.

32. The silent radar system of claim 27 having said attenuator output fed to a frequency dispersive network prior to being fed to said transmitter means thereby allowing the transmission of wide band noise signals not readily discernible by said target aircraft.

33. The silent radar system of claim 32 wherein said receiver means has a spectrum compressing means to thereby reconstitute the frequency dispersion that occurred in said frequency dispersive network and provide a signal which is more readily processed.

34. The combination of claim 28 wherein said doppler filter band means consists of narrow band filters whose characteristics have been selected to achieve unambiguous range and velocity information.

35. The combination of claim 27 wherein said delay means consists of a continuously variable delay device.

36. Silent radar system for locating a target carrying a receiver without being detected by said receiver comprising A. means for transmitting wide band random noise signals, B. means for storing the history of said signals prior to transmissions, C. means for receiving said transmitted signals reflected from said target, D. means for comparing said reflected signals with said stored signals, E. means for deriving from said compared signals information as to the target's position and velocity, F. and means for controlling the signal level of said transmitted signals so that said transmitted signals cannot be detected at said target's receiver means, while the received signals at said radar receiver means reflected from said target can be detected.

37. Silent radar system for locating a target carrying a receiver without being detected by said receiver comprising A. means for transmitting wide band signals, B. means for storing the history of said signals prior to transmission, C. means for receiving said transmitted signals reflected from said target, D. means for comparing said reflected signals with said stored signals, E. means for deriving from said compared signals information as to the target's position and velocity, F. and means for controlling the power level of said transmitted signals so that said transmitted signals cannot be detected at said target receiver while the received signals at said radar receiver means reflected from said target can be detected.

38. The combination of claim 37 wherein said means for controlling the signal level of said transmitted signals contains programming means to always maintain said transmitted signal level below the limit of discernibility of said receiver in said target.

39. The combination of claim 37 wherein said control means further includes means for controlling the signal level of the transmitter signal for a multiplicity of targets having different range-azimuth coordinates.

40. The combination of claim 39 wherein said transmitting means further includes sector scan means for controlled scanning in a preselected pattern.

41. Silent radar system for locating a target carrying a receiver without being detected by said receiver comprising A. means for transmitting a spectrum of noise signals, B. means for storing the history of said signals prior to transmission, C. means for receiving said transmitted signals reflected from said target, D. means for comparing said reflected signals with said stored signals, E. means for deriving from said compared signals information as to the target's position and velocity, F. and means for controlling the signal level of said transmitted signals so that said transmitted signals cannot be detected at said target receiver means while the received signals at said radar receiver means reflected from said target can be detected.

42. The combination of claim 41 wherein said means for controlling the signal level of said transmitted signal includes A. a memory logic unit containing a stored program fed from said range information means, B. a range power function generator fed from said memory logic unit, C. and a variable attenuator controlled by said range power function generator to set the signal level of said transmitted signals.

43. Silent radar system for locating a target carrying a receiver without being detected by said receiver comprising
  A. means for transmitting pseudo random noise signals,
  B. means for storing the history of said signals prior to transmission,
  C. means for receiving said transmitted signals reflected from said target,
  D. means for comparing said reflected signals with said stored signals,
  E. means for deriving from said compared signals information as to the target's position and velocity,
  F. and means for controlling the signal level of said transmitted signals so that said transmitted signals cannot be detected at said target receiver means while the received signals at said radar receiver means reflected from said target can be detected.

44. An IFF and silent radar system for detection and identification of friendly targets at a distance without said target being able to determine it was detected and interrogated comprising
  A. receiver means carried by said target,
  B. electronic jammer means of the repeater type carried by said target operating in conjunction with said receiver means for transmitting signals in a predetermined manner,
  C. means at said radar for transmitting wide band random noise signals,
  D. means at said radar for storing the history of said signals prior to transmission,
  E. said receiver means at said target receiving said transmitted signals and said jammer means transmitting said signals in a predetermined pattern,
  F. means at said radar for receiving said transmitted signals reflected from said target and from said jammer,
  G. means at said radar for comparing said reflected and said jammer signals with said stored signals,
  H. means at said radar for deriving from said compared signals information as to the target's position and velocity,
  I. means at said radar for deriving from said compared signals information as to the target's identity,
  J. and means for maintaining the signal level of said radar transmitted signals so that said transmitted signals cannot be detected at said target's receiver means, while the received signals at said radar receiver means reflected from said target transmitted by said jammer can be detected.

45. A system for identifying a friendly target at a distance without said target being able to determine it was detected and identified comprising
  A. receiver means carried by said target,
  B. electronic jammer means of the repeater type carried by said target operating in conjunction with said target receiver means for transmitting signals in a predetermined manner,
  C. means located at a station remote from said target for transmitting wide band random noise signals,
  D. means located at said station for storing the history of said wide band signals prior to transmission,
  E. said receiver means at said target receiving said wide band transmitted signals and said jamming means transmitting said signals in a predetermined manner,
  F. means located at said station for receiving said signals transmitted by said jammer means,
  G. means at said station for comparing said signals from said jammer and said stored signals,
  H. means at said station for deriving from said compared signals information as to said target's identity,
  I. and means for maintaining the signal level of said station's wide band transmitted signals at a level that cannot be detected at said target's receiver while the received signals can be detected by said station's receiver.

46. The method of operating a radar system which can detect a target having an intercept receiver but which cannot be detected by said target which comprises the following steps
  A. providing a radar system which is optimized to receive signals not discernible to said target intercept receiver,
  B. transmitting a wide band random signal,
  C. storing the history of said signal before transmission,
  D. receiving said signal reflected from said target,
  E. Comparing said received reflected signal with said stored signal,
  F. Deriving information from said compared signals as to the target's position and speed,
  G. and controlling the transmitted signal level so that it cannot be detected by said target receiver while it can be detected by said radar receiver.

47. The method of operating a radar utilizing wide band noise transmission and sensitive signal processing capabilities so that the radar can detect targets having intercept receivers without being discerned by said target which consists of
  A. illuminating said target with wide band noise signals,
  B. adjusting the power level of said signals so that said target cannot discern them while the reflected signals from said target are discernible to said radar.

48. The method of operating a radar which has a greater sensitivity than the intercept receiver of a target so it detects said target without said target being able to discern it has been detected which consists of
  A. illuminating the target with a signal whose level is below the discernible level of said target receiver while the signals reflected from said target are detectable by said radar, and
  B. controlling the level of said signals as the target's range changes to maintain the signal level undiscernible to the target receiver while still discernible to said radar.

* * * * *